United States Patent [19]

Becker

[11] Patent Number: 4,897,759
[45] Date of Patent: Jan. 30, 1990

[54] METHOD AND APPARATUS FOR ERASING INFORMATION FROM MAGNETIC MATERIAL

[75] Inventor: Donald G. Becker, Lincoln, Nebr.

[73] Assignee: Garner Industries, Inc., Lincoln, Nebr.

[21] Appl. No.: 180,681

[22] Filed: Apr. 8, 1988

Related U.S. Application Data

[63] Continuation-in-part of Ser. No. 933,013, Nov. 19, 1986, abandoned.

[51] Int. Cl.$^4$ .............................................. H01F 13/00
[52] U.S. Cl. ..................................................... 361/151
[58] Field of Search ............... 361/145, 149, 151, 221, 361/267

[56] References Cited

U.S. PATENT DOCUMENTS

| | | | |
|---|---|---|---|
| 3,506,884 | 4/1970 | McKinley | 361/151 |
| 3,938,011 | 2/1976 | Littwin | 361/151 |
| 4,346,426 | 8/1982 | Baumann et al. | 361/151 |

FOREIGN PATENT DOCUMENTS 0449926  7/1936  United Kingdom ................ 361/149

OTHER PUBLICATIONS

Garner Industries Model 270 Blueprints.
Bower, W. F. "Demagnetizing Parts of Anti-Friction Bearings", Electrical World, Feb. 2, 1946.
Garner Industries Model 1200/1400 Brochure.

*Primary Examiner*—L. T. Hix
*Assistant Examiner*—David M. Gray
*Attorney, Agent, or Firm*—Vincent L. Carney

[57] ABSTRACT

To degausse high coercivity magnetic recording media, a programmable degausser includes at least first and second stations positioned at 45 degrees with respect to an anti-static conveyor belt passing through their centers and at a 90 degree angle with respect to each other. The stations include coils wound on insulated bobbins and the degausser is programmable to selectively operate continuously, operate manually, operate in response to detected recording or operate when there is no low-current or low-temperature warning alarm.

14 Claims, 9 Drawing Sheets

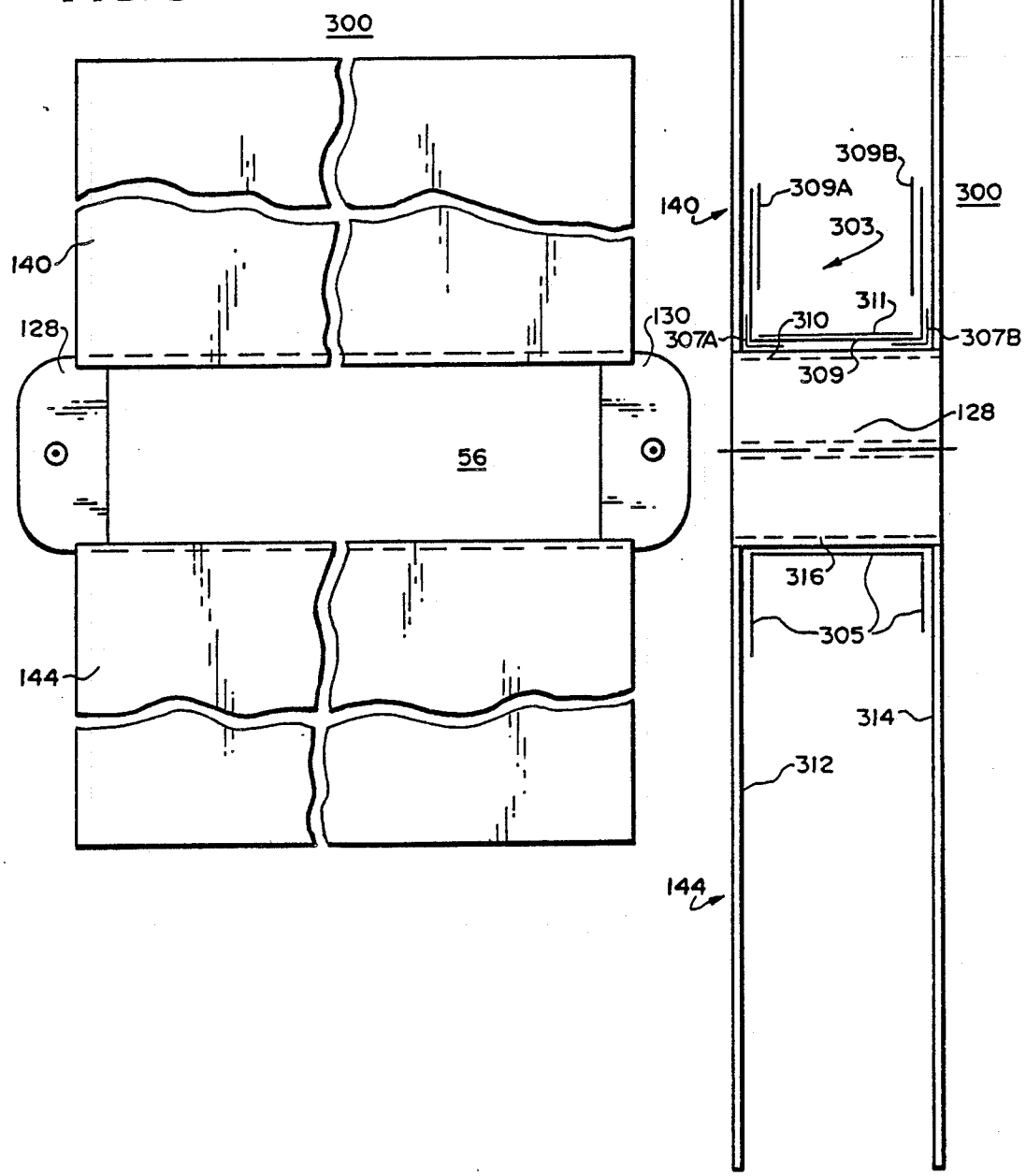

METHOD AND APPARATUS FOR ERASING INFORMATION FROM MAGNETIC MATERIAL

This application is a continuation-in-part of application Ser. No. 933,013, filed Nov. 10, 1986, now abandoned.

BACKGROUND OF THE INVENTION

This invention relates to methods and apparatuses for erasing information from a magnetic recording medium.

One class of apparatuses for erasing information from magnetic recording media includes one or more coils which are energized to create an electromagnetic field that varies with time but is spatially uniform in the space through which the magnetic recording medium passes. The magnetic recording medium is moved on a conveyor through the field.

In one prior art type of apparatus and method for erasing magnetic recording media, the magnetic recording media is stationary in a field created by two solenoids at an angle to each other and in another type, the magnetic material is moved on a conveyor while oriented in one position as it passes through the field. If demagnetization is insufficient, after passing through in one position, the magnetic recording medium may be repositioned on the conveyor and moved through the field while oriented in another direction.

The prior art methods and apparatuses for erasing magnetic material have a disadvantage in that either the information is not sufficiently erased or it is sent through a degaussing field multiple times with different orientations, thus increasing the time required for erasing the magnetic material.

In the prior art type apparatuses for erasing information from magnetic material in which the field is created by coils at angles to each other, the process is not continuous. Manual handling of the tape is required and the erasing is done in a field which is not uniform and not parallel to the surfaces of the magnetic material.

Attempts to provide continuous motion of the magnetic material through multiple uniform fields with different orientations have faced a problem in that residence time within fields that are strong enough to adequately erase high coercive magnetic material generate so much heat because of their inefficiency they require elaborate cooling systems. Frequently, such systems require liquid cooling.

SUMMARY OF THE INVENTION

Accordingly, it is an object of the invention to provide a novel method and apparatus for erasing magnetic material.

It is a further object of the invention to provide a degaussing apparatus capable of erasing high coercive magnetic material continuously and inexpensively.

It is a further object of the invention to provide an economical air-cooled degaussing apparatus.

It is a still further object of the invention to provide a degaussing apparatus which is capable of erasing high coercively material with sufficient efficiency to reduce the heat that is created.

It is a still further object of this invention to provide a degaussing coil which is easier to tune.

It is a still further object of the invention to provide a degaussing apparatus with lower power losses and reduced problems from heating caused by induced current in conductive materials.

It is a still further object of the invention to provide degaussing apparatuses which operate more efficiently because of lower reduction in fields caused by eddy currents.

It is a still further object of the invention to provide degaussing apparatuses in which there are lower mechanical vibrations because there are lower opposing fields induced by eddy currents.

It is a still further object of the invention to provide a degaussing apparatus which operates on a relatively low frequency.

In accordance with the above and further objects of the invention, a magnetic material eraser includes at least first and second coils each adapted to have current flow through them to create first and second electromagnetic fields and means for continuously moving the magnetic material through each field. The first and second coils are at an angle with respect to each other and the means for moving passes sequentially through the coils, making a different angle with each field. The fields have a peak magnetizing force with a value in the range of 500 to 5,000 oersteds and the magnetic material moves through a relatively uniform field.

Advantageously, the first and second coils are enclosed in a housing and fans blow filtered air on them. In one embodiment, a sensor is actuated by the magnetic material to control the time the coils are energized.

To avoid loss of efficiency in creating the electromagnetic fields of adequate strength, metallic surfaces around the fields are insulated to break circuit paths through which current might otherwise flow and create a field opposed to the electromagnetic field. To avoid arcing and corona, the surfaces adjacent to the insulated wire of the coils are insulated with high dielectric breakdown material to reduce corona and the conductive surfaces are covered or made smooth.

To permit flexibility in programming, programmable switches cooperate with manual switches and sensors to select the operation when the field strength is low or the temperture too high. Alarms and interruption of operation is programmed. Moreover, recording media to be erased can be sensed as it enters the magnetic material eraser and operations controlled as programmed in accordance with this sensing.

In one embodiment, the degaussing coil has a resonant frequency lower than the mains frequency, such as 20 cycles per second. Power is applied to this circuit to result in this frequency modulating the degaussing field so that the degaussing field is substantially at 20 cycles per second rather than 60 cycles per second.

One method of achieving this lower frequency power is to gate current from the mains field, which may be 60 or 50 hertz, into the coil at a frequency which will supply power to it adequate to maintain the coil in resonance. Because the coil is a resonant circuit, the waveform of the current is substantially sinusoidal. As the material that is to be degaussed passes through the demagnetizing field, its magnetic domains are reoriented by being subjected to at least $1\frac{1}{2}$ cycles, with the change in flux near the end of its travel path being reduced to substantially eliminate remnant flux.

One method of generating such pulses is to connect the primary of the transformer to a current gate such as a Triac semiconductor and to trigger the current gate at increments which are a subharmonic or a harmonic of the resonant frequency of the coil. In one embodiment this is accomplished by rectifying the mains power, conditioning the waveform of the rectified power into pulses, applying a compensating delay to bring the pulses into the desired synchronism with the mains power sine waveforms, applying the power to a counter and using the output from the counter to open the current gate or to generate other signals that open the current gate. The current gate in one embodiment is opened every cycle and a half or on every sixth quarter cycle of the mains frequency.

From the above description, it can be understood that the magnetic material erasing apparatus and method of this invention has several advantages, such as: (1) it is capable of continuously erasing units of magnetic material in rapid succession; (2) it is capable of efficiently erasing high coercive magnetic material to a relatively high degree; (3) it is able to perform with relatively low heat generation; and (4) it is relatively low cost.

SUMMARY OF THE DRAWINGS

The above noted and other features of the invention will be better understood from the following detailed description when considered with reference to the accompanying drawings in which:

FIG. 8 is a side elevational view of a bobbin useful in an embodiment of the invention;

FIG. 9 is a front elevational view of the bobbin of FIG. 8;

DETAILED DESCRIPTION

Figure 1:
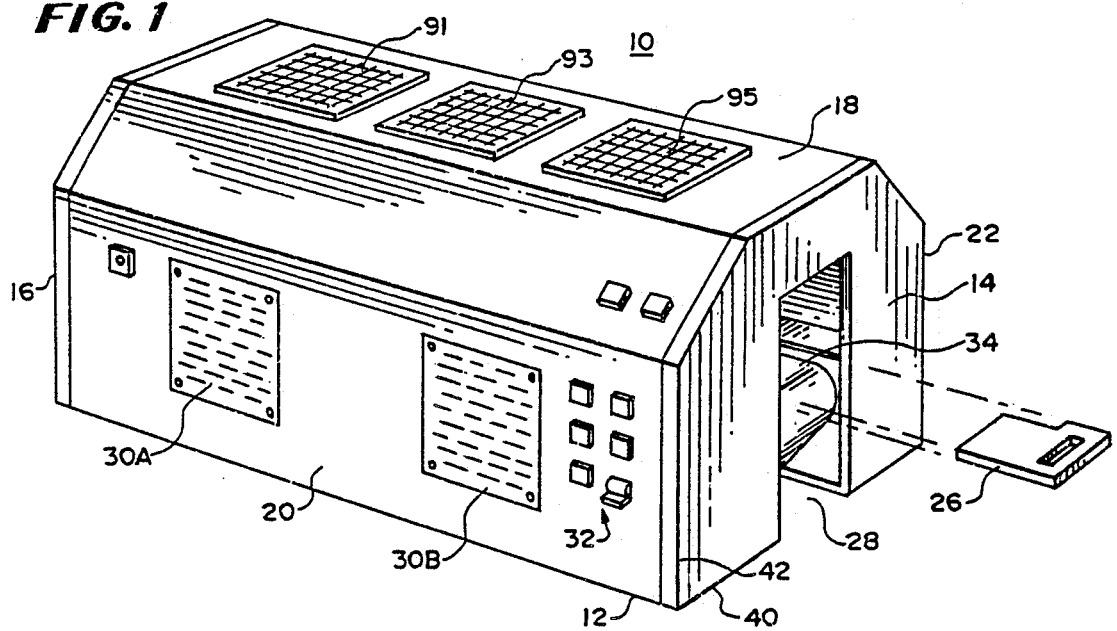
FIG. 1 is a perspective view of an embodiment of degausser in accordance with the invention.

In FIG. 1, there is shown a magnetic media degausser 10 having a flat horizontal base 12, a flat vertical entrance side wall 14, a flat vertical exit side wall 16, a top wall 18 partly horizontal and partly slanted and front and rear side walls 20 and 22, respectively. The base 12 and walls 14–22 form an enclosure within which magnetic fields are applied to a magnetic media to erase information contained thereon.

To continuously process a sequence of magnetic media, the magnetic media degausser 10 includes an entrance 28 and a conveyor 34 for receiving and carrying magnetic media such as the video cassette 26. The entrance 28 is within the entrance wall 14 and provides access to the conveyor 34 for receiving the video cassette 26, which may then be carried by the conveyor 34 to the exit side wall 16. The degausser 10 also includes means for creating a uniform magnetic field, directed in a horizontal plane in at least two different directions at two different stations to disturb the orientation of magnetic domains on magnetized tape in one passage through the housing on the conveyor 34 and thus permit continuous degaussing.

The tape is wound about a reel so that its longitudinal length is curved about an axis perpendicular to the plane of conveyor 34. The height of the reel and width of the tape are perpendicular to the conveyor 34 so that a magnetic field parallel to the conveyor reorients magnetic domains on the tape with the vertical field which is in one direction parallel to the tape affecting all those domains except those oriented perpendicular to it and the other field at an angle to the first field reorienting the remainder of the magnetic domains.

To provide cooling, the housing includes fans which process air through filtered vents, two of which are shown at 30A and 30B. The entire operation is under the control of certain controls on the front panel such as those shown at 32 to permit safe starting and stopping of the conveyor 34 and energization of the magnetic fields.

To more easily accommodate the conveyor 34, the entrance 28 is cut into the horizontal base 12 to receive the bottom run of the conveyor 34. The bottom run of the belt runs along below the horizontal base 12 toward the exit side wall 16 and re-enters the housing near it. This arrangement saves space within the housing.

Figure 2:
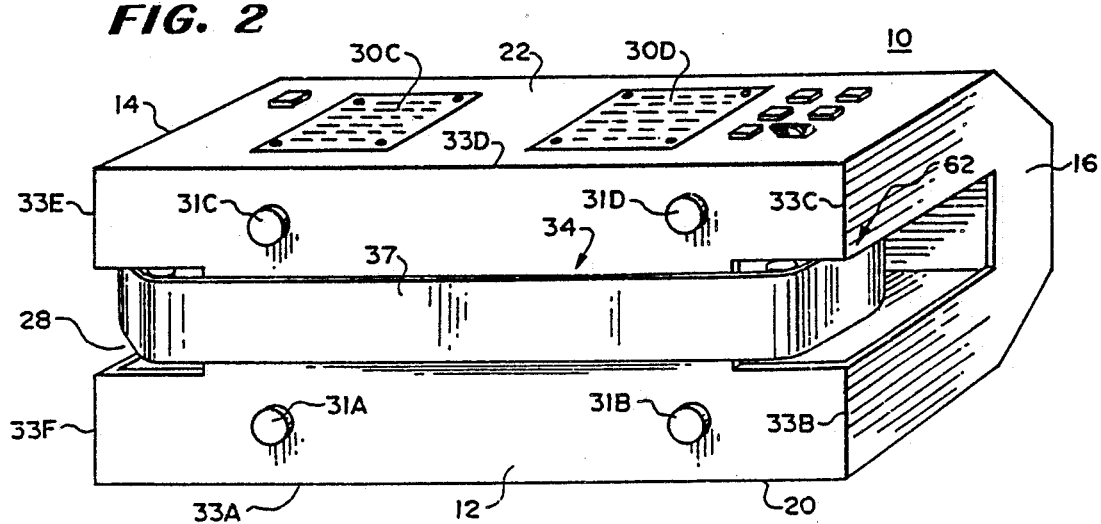
FIG. 2 is a perspective view of the embodiment of degausser of FIG. 1 shown from another position.

In FIG. 2, there is shown a bottom view of the degausser 10 illustrating the exit side wall 16, the exit end of the conveyor 34, the horizontal base 12 and the filters 30C and 30D. To permit the bottom run of the conveyor belt to clear the surface upon which the degausser 10 rests, four feet 31A, 31B, 31C and 31D extend downwardly from the horizontal base wall 12 a distance beyond the bottom run of the conveyor.

To prevent current from circulating through the cabinet, the horizontal base wall 12 includes insulation between its edges at 33A–33F separating it from the front, rear, entrance and exit side walls 20, 22, 14 and 16, respectively. Because of high resistance and location, the insulation breaks the circuit through the cabinet otherwise created by the electromagnetic field of the solenoids within the housing of the degausser 10. The insulated portions 33A–33F have a sufficiently high resistance to break any circuit that might be formed by conductive parts of the housing and to prevent currents which otherwise are induced in the housing from creating their own electromagnetic fields in a direction opposing the degaussing fields.

Figure 3:
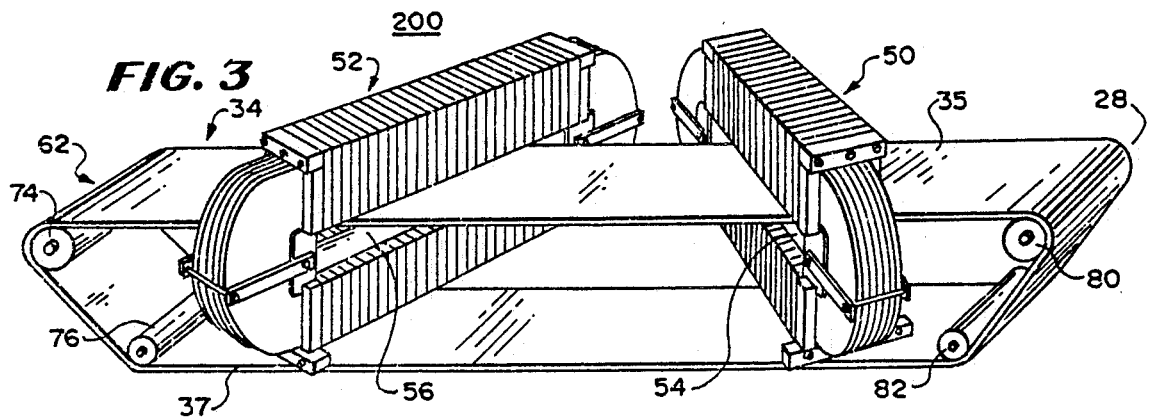
FIG. 3 is a simplified perspective view of the erasing magnetic coils and conveyor belt of the embodiment of FIG. 1.

In FIG. 3, there is shown a simplified perspective view of the interior of the magnetic media degausser 200 having a first coil assembly 50 and a second coil assembly 52 with the top run 35 of the conveyor 34 passing through the centers of the first and second coil assemblies 50 and 52. The conveyor 34 is mounted to be horizontal and to pass through both the first and second coil assemblies 50 and 52, which coil assemblies are at an angle to each other in the region through which the top run 35 of the conveyor 34 passes. In the preferred embodiment, this angle is 90 degrees with each of the first and second coil assemblies 50 and 52 being at a 45 degree angle to the longitudinal axis of the conveyor 34.

With this arrangement, the first and second coil assemblies 50 and 52 generate fields at 45 degrees to the path of motion of the magnetic media as it moves from the entrance 28 toward the exit and when the magnetic media is within a window, the coil assembly having that window generates a horizontal magnetic field at 45 degrees to the direction of motion of the magnetic media but 90 degrees to the field of the other coil assembly, thus encompassing all of the magnetic domains in an alternating field to degauss the magnetic material.

The first and second coil assemblies 50 and 52 are elongated and include first and second windows 54 and 56, respectively, through their centers. The first and second windows 54 and 56 are sufficiently long and high to permit the top run 35 of the conveyor 34 and the magnetic material it carries to pass through them.

To provide the best results, each of the first and second windows 54 and 56 has: (1) a width at least sufficient to accommodate the top run 35 of the conveyor 34 and preferably 1.4 times the width of the conveyor 34; and (2) a height sufficient to carry at least one run of the conveyor 34 and the magnetic material it is designed to accommodate through its center. If the angles made by the first and second coil assemblies 50 and 52 to the direction of motion of the conveyor 34 are other than 45 degrees, then the first and second windows 54 and 56 must be equal in length to at least the width of the conveyor 34 divided the sine of the angle that the first and second windows 54 and 56 make with the conveyor 34.

In an embodiment which includes the first and second coil assemblies 50 and 52 with the top run 35 of the conveyor 34 passing through their centers, the arrangement of 45 degrees with the belt reduces the required window length by having the angles equal while maintaining the optimum 90 degree angle with respect to each other although the angle may be less than 90 degrees or more than 90 degrees and still accomplish effective erasing. However, the angle between two coil assemblies, if only two are used, should not be greater than 120 degrees. More than two coil assemblies may be used to create a field which is at different angles to provide the appearance of differently angle fields to the magnetic tape or, if a large number of coil assemblies are used, of a rotating field.

The field strength and time within the field for the magnetic media must be sufficient to remove orientation of magnetic domains on it. This time and strength varies with the coercivity of the magnetic media and the degree of erasure usually measured in terms of the signal level remaining after erasing as compared to the original signal level. The peak magnetizing force should be between 500 and 5,000 oersteds and should erase to between 70 and 95 decibels relative to an unerased signal for tapes having a coercive force of between 200 to 700 oersteds. Generally the peak magnetizing force is three times the coercive force of the material to be degaussed.

In one embodiment, the degaussing coil has a resonant frequency lower than the mains frequency, such as 20 cycles per second. Power is applied to this circuit to result in this frequency modulating the degaussing field so that the degaussing field is substantially at 20 cycles per second rather than 60 cycles per second.

One method of achieving this lower frequency power is to gate current from the mains source, which may be 60 or 50 hertz, into the coil at a frequency which supplies power to the coil adequate to maintain the coil in resonance. Because the coil is a resonant circuit, the waveform of the current is substantially sinusoidal. As the material that is to be degaussed passes through the demagnetizing field, its magnetic domains are reoriented by being subjected to at least 1½ cycles, with the change in flux near the end of its travel path being reduced to substantially eliminate remnant flux.

One method of generating such pulses is to connect the primary of the transformer to a current gate such as a Triac semiconductor and to trigger the current gate at increments which are a subharmonic or a harmonic of the of the resonant frequency of the coil. In one embodiment this is accomplished by rectifying the mains power, conditioning the waveform of the rectified power into pulses, applying a compensating delay to bring the pulses into the desired synchronism with the mains power sine waveforms, applying the pulses to a counter and using the output from the counter to open the current gate or to generate other signals that open the current gate. The current gate in one embodiment is opened every cycle and a half or on every sixth quarter cycle of the mains frequency.

The conveyor 34 is generally insulative and antistatic to not reduce the effectiveness of the electromagnetic field by generating flux with an opposite polarity. In this specification, antistatic means the belt does not generate a charge with respect to ground or the device it carries sufficient to cause an electric discharge between the tape or other magnetic device and the belt or ground upon removing the tape from the belt. In the preferred embodiment, the belt is made of volcanized EPDM rubber (terpolymer elastomer made from ethylene-propylene diene monomer) It is 6.25 inches wide and 0.06 inches thick in the preferred embodiment and should be between 0.03 inches and 2 inches thick and 3 to 10 inches wide. The travel speed in the preferred embodiment is 4 inches per second and should be at least 1 inch per second.

Figure 4:
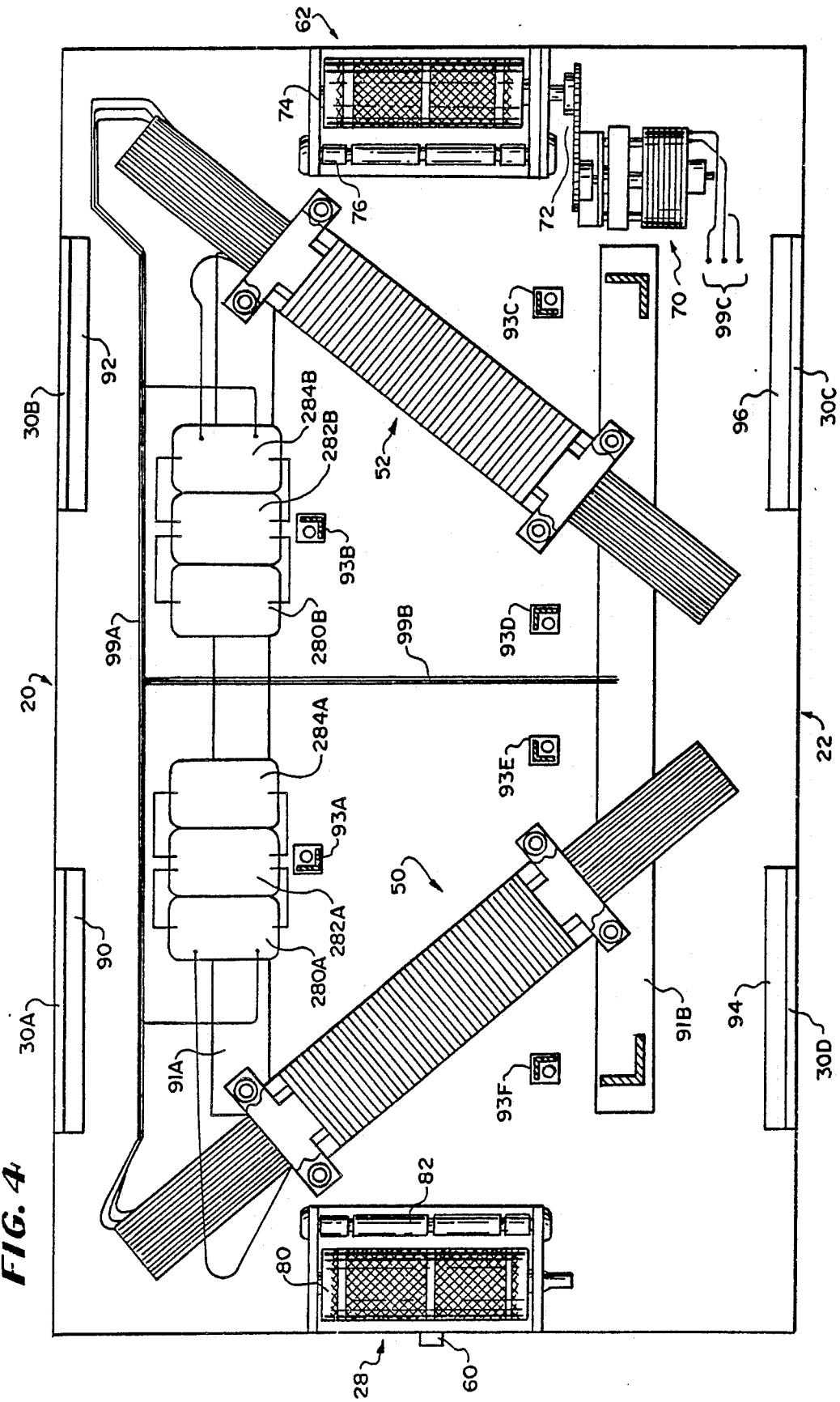
FIG. 4 is a plan view of the base of the embodiment of FIG. 1, showing the manner in which the demagnetizing windings are connected.

In FIG. 4, there is shown a plan view of the base 46 of the magnetic media degausser 10 (FIG. 1) showing a photocell 60 at the entrance 28, the first and second coil assemblies 50 and 52 and an exit end 62, for the flow of a continuous stream of magnetic tapes to be erased while being carried from the entrance 28 to the exit end 62 on the conveyor belt 34 (FIGS. 1 and 2). The speed of this path is controlled by a multiple speed motor in accordance with the frequency response and coercive force of the magnetic media and the field strength and field shape at the exit ends of the coils.

The exit end 62 of the housing includes a motor 70, a transmission 72, a drive roller 74 and idler roller 76 with the motor 70 being connected to the drive roller 74 through the transmission 72 to drive the conveyor belt 34 and pull the top run 35 (FIG. 3) taunt as it carries the magnetic media through the degausser 10 (FIG. 1). The motor 70 may be any standard type of motor as may be the mechanism for pulling the conveyor 34. The drive roller 74 pulls the top run 35 of the belt and the idler roller 76 supports the bottom run 37 (FIGS. 2 and 3), holding it below the horizontal base wall 12 (FIG. 2) of the enclosure.

To reduce loss of energy and undue heating, plastic bearings are used to rotatably hold the rollers. This prevents eddy currents induced by the coil assemblies 50 and 52 from creating fields opposed to those used for degaussing and heating the rollers.

The entrance 28 includes a photocell 60 (to be described hereinafter) for detecting the magnetic media, idler rollers 80 and 82 for supporting the entrance end of the conveyor 34 so that, the video cassette 26 (FIG. 1) or other magnetic media placed on conveyor 34 are detected by a photocell to turn on the power to the first and second coil assemblies 50 and 52. In some embodiments, the photocell 60 is not included and in others it is included. Without it, the first and second coil assemblies 50 and 52 are either on continuously during operation or manually energized.

Mounted part way up the front and rear side walls 20 and 22 (FIG. 1) are the filter assemblies 30A-30D adjacent to openings in the front and rear side walls 20 and 22. To cool the magnetic media degausser 10 (FIG. 1), four forced-air fans 90, 92, 94 and 96 are utilized to draw air through the filtered vents 30A-30D so that clean air is circulated against all sides of the first and second coil assemblies 50 and 52 and out of the housing through the top vents 91, 93 and 95 (FIG. 1). The temperature is monitored by a thermostat (not shown in FIG. 4) and the current through the first and second coil assemblies 50 and 52 is measured by an ammeter (not shown in FIG. 4).

To tune the first and second coil assemblies 50 and 52 to resonance, capacitors 280A, 282A, 284A, 280B, 282B and 284B are connected in a manner described hereunder. Three capacitors are used to tune each coil to resonance at 50 hertz and two are used for 60 hertz (three being shown in FIG. 4). Multiple parallel capacitors are used to permit the size to be as small as possible.

For ease in mounting the first and second coil assemblies 50 and 52, first and second brackets 91A and 91B each connect corresponding ends of the first and second coil assemblies with the second bracket 91B connecting the ends of the coil assemblies closest together and the first bracket 91A connecting the ends of the coil assemblies furthest apart to maintain the angle between them.

To support the top run of the belt, eight support posts, six of which are shown at 93A-93F extend upwardly to the level of the windows 54 and 56 (FIG. 3) through the first and second coil assemblies 50 and 52. These posts may support a backing for the conveyor to hold the belt. To electrically convert the first and second coil assemblies and the separators into resonant circuits with a source of AC power and ammeter, conductors to be described hereinafter are combined into cables as shown at 99A-99C.

Figure 5:
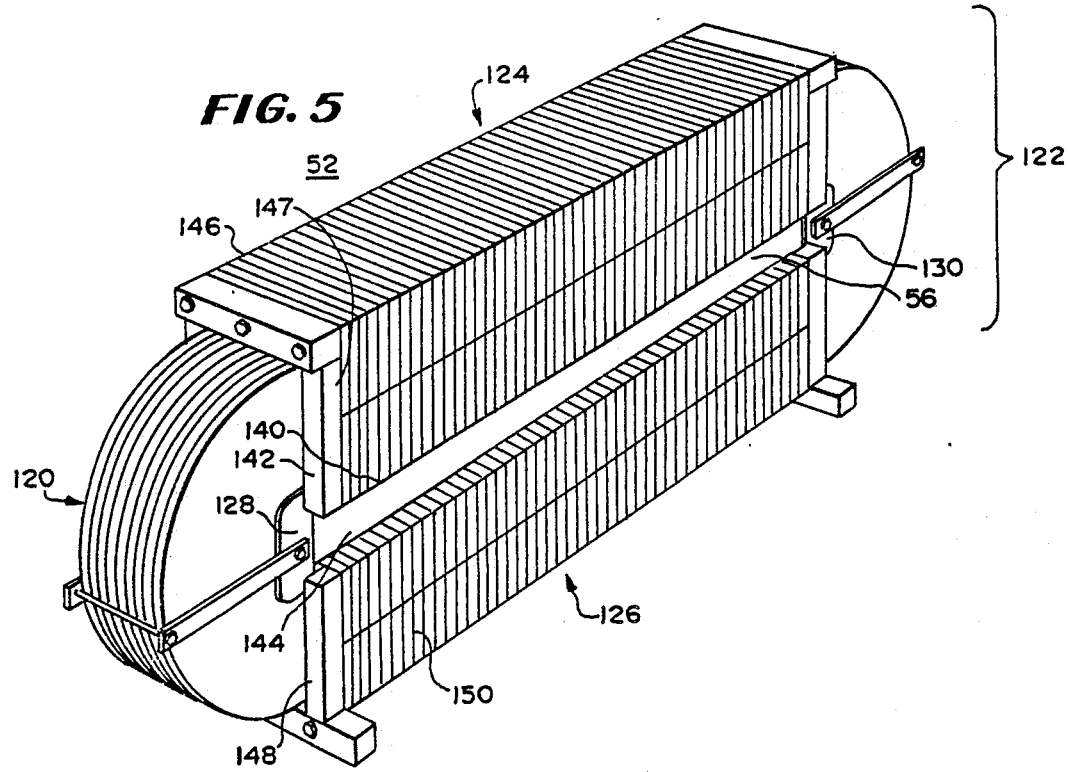
FIG. 5 is a perspective view of one of the demagnetizing coils of the embodiment of FIG. 1.

In FIG. 5, there is shown a simplified perspective view of the second coil assembly 52 having a coil 120 and bobbin 122 forming an assembly. The bobbin 122 includes an upper bobbin assembly 124, a lower bobbin assembly 126, a first spacer 128 and a second spacer 130 with the upper and lower bobbin assemblies 124 and 126 forming the top and bottom of a window 56 and the first and second spacers 128 and 130 separating the upper and lower bobbin assemblies 124 and 126 to define the right and left-hand side of the window 56.

The upper bobbin assembly 124 includes an upper channel 140, an upper cover for the channel 142 and upper laminations 146. The lower bobbin assembly 126 includes a lower channel 144, a lower cover 148 and lower laminations 150. The upper and lower channels 144 and 140 are respectively U-shaped upwardly and inverted "U" to define the window between them with the wire being wound starting from the base of the "U" outwardly to form the coil 120. The upper and lower covers 142 and 148 are of Teflon (a trademark of DuPont Corporation for polytetrafluoroethylene).

To provide a high permeability path for flux except in the second window 56, the upper laminations are U-shaped and are placed as inverted "U"s over the upper channel 140 and upper channel cover 142, with the base of the "U"s fitting over the cover and the legs of the "U" facing downwardly over the sides of the upper channel 140. They are packed together to form a ferromagnetic path around the upper strands of the coil 120 for flux.

A similar low reluctance path is formed for flux over the lower channel by the lower laminations 150 which are U-shaped ferromagnetic laminations placed side-by-side with their base over the lower cover 148 and their sides outside of and conforming to the sides of the lower channel 144. They are packed together in a manner similar to the upper laminations 146 to form a low reluctance path for flux around the lower strands of the coil 120 to concentrate the flux in the second window 56.

While the concentrated horizontal uniform flux in the second window 56 is provided by a single coil with the conductors on each side of the coil being covered with a low reluctance path and the current through the conductors resulting in flux through the window between them in the same direction, other configurations than a single coil may be used. Multiple coil may be used either side-by-side or one under the other provided the fields between them are in the same direction and the reluctance is maintained low in paths other than the flux path through the window.

Generally, the field intensity should be in the range of between 500 and 5,000 oersteds and the magnetic material should be in the field of this strength for at least two cycles of the AC field. The field has a section of uniform full peak strength and fringes have lower strength at the entrance and exit of the field. The magnetic material should be in the peak strength area at least during one peak of the AC cycle and in the fringe for a declining lesser value during a peak of the AC cycle.

In the preferred embodiment, the flux density is 2,400 gauss with 2,400 oersteds of degaussing force. Thus, the conveyor 34 must move the magnetic medium through the field at a rate that maintains such part of them in the field for at least two cycles of AC current through the coils. More specifically, a point on conveyor 34 remains in the uniform field for at least two cycles of operation of the coil assembly energizing field, passing through at least one peak in the area of maximum field strength and one cycle in a fringe area of lesser field strength.

Figure 6:
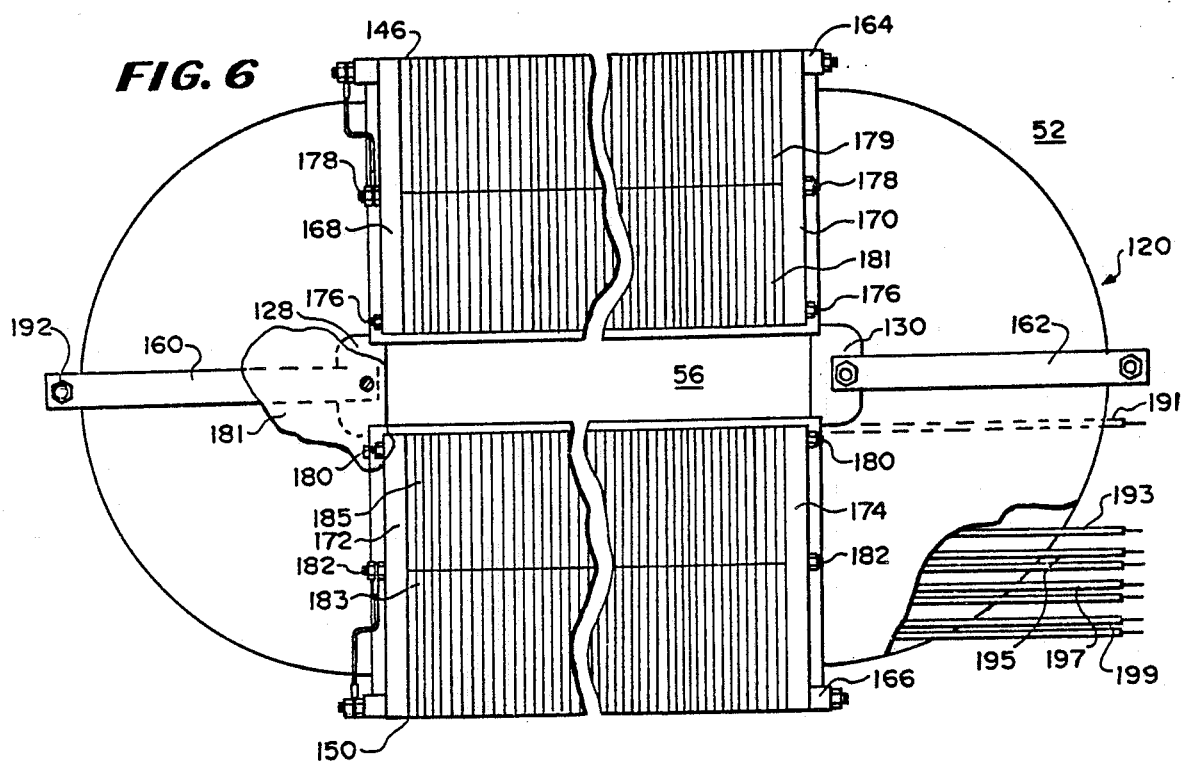
FIG. 6 is a front elevational view of the magnetic winding of FIG. 5.

In FIG. 6, there is shown a side elevational view of the second coil assembly 52 having the second window 56, the coil 120, the upper and lower laminations 144 and 150, the insulated wire holders 160 and 162, the upper and lower brackets 164 and 166, respectively, covered by the upper and lower laminations 144 and 150 and the lamination insulators 168, 170, 172 and 174.

The lamination insulators 168 and 170 are bolted together at two points by bolts 176 and 178 and the lower laminations 150 are held by the lamination insulators 172 and 174, bolted together with two bolts 180 and 182 on one side. Similarly, on the other side, bolts hold together the lamination so they may be squeezed and then bolted together. On the top side, the upper bracket 164 is electrically connected to bolt 178 and the lower bracket 166 on the lower side is electrically connected to the bolt 182 to maintain ground level potential on the insulators 172 and 174.

The upper lamination 144 is formed of U-shaped laminations and I-shaped laminations. The U-shaped laminations 179 are formed of E-shaped standard laminations with the center leg removed and the I-shaped laminations 181 are formed of the center leg of the E-shaped standard lamination. The U-shaped laminations 181 are bolted at 178 and the I-shaped laminations 150 are formed of U-shaped laminations 183 and I-shaped laminations 185.

The conductors 191 and 199 are the high voltage conductors of the secondary and the conductors 195, 197 and 193 are conductors of the primary, low-voltage winding. The conductors 195, 197 and 199 are shown as pairs of conductors but are each two conductors that are electrically at the same location created during the winding of the bobbin as a loop, later cut and joined to make a single conductor.

The ends of the bolts 176 and 180 are covered with a small amount of silicone rubber compound sold under the brand name RTV (trademark of General Electric Co., Polymer S Product Dept., Pittsfield, Mass. 01201), a portion of which is shown at 181. This prevents arcing to the spacers 128 and 130 or other parts of the bobbin that are at ground level. In the preferred embodiment, the entire sides are covered with this material for ease of treatment, care being taken to cover bolt ends such as 176. This is not shown over the entire surface in FIG. 6, for clarity.

Figure 7:
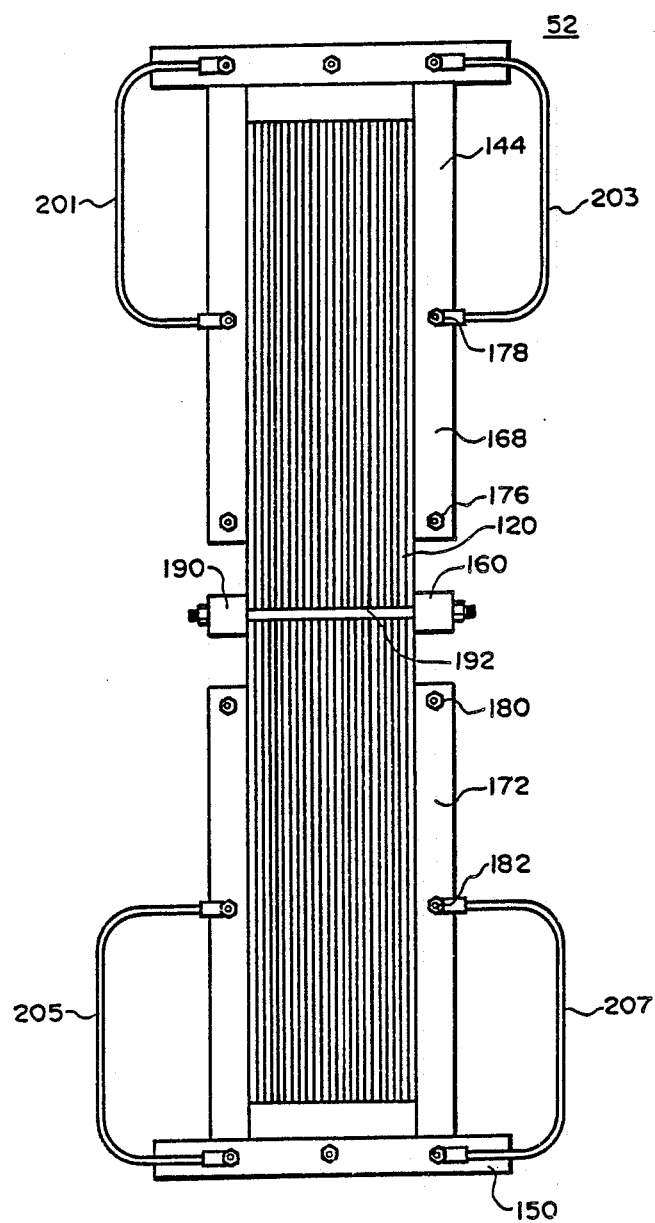
FIG. 7 is a side elevational view of the magnetic winding of FIG. 5.

In FIG. 7, there is shown a side elevational view of the second coil assembly 52 showing the winding 120 supported by the insulated wire holder 160 and a second insulated wire holder 190 held together at their ends by a bolt 192. The second coil assembly 52 includes an inner and outer coil, with the inner coil being a high voltage coil and the outer coil being a low voltage coil, is wound on the outside and coupled by transformer action to the inside coil so that the low voltage coil is adjacent to the ferromagnetic laminations, thus reducing the chances of a breakdown through the insulation. Conductors 201, 203, 205 and 207 insure a ground connection between the end supports for the laminations and the housing. To avoid obscuring parts, the silicon rubber insulation is omitted from the drawing.

In FIG. 8, there is shown a side elevational view of a coil bobbin 300 having first and second spacers 128 and 130, an upper channel 140, a lower channel 144 and the second window 56. The upper and lower channels 140 and 144 are joined by epoxy to the first and second spaces 128 and 130 to form the window 56 between them. With this, the first and second spacers 128 and 130 and the bottoms of the two channels 140 and 144 are held firmly in place a sufficient distance apart to permit the passage of the upper run 35 of the conveyor 34 therethrough carrying a recording to be erased. The upper and lower channels 140 and 144 receive the coil to permit relatively easy winding of wire therearound.

In FIG. 9, there is shown a side elevational view of the coil bobbin 300 illustrating the upper and lower channels 140 and 144 and the manner in which they are connected to the first and second spacers 128 and 130, with the first spacer 128 being shown in FIG. 9. As best shown in this view: (1) the upper channel 140 includes first and second vertical, parallel sides 306 and 308 and a bottom 310; and (2) the lower channel 144 includes corresponding first and second vertical, parallel sides 312 and 314 and a top 316.

In one embodiment, after being joined to the first spacer 128, the inner surfaces of the upper and lower channels are roughened and a conductive foil attached with epoxy on the inside surface. The foil is grounded at one end to permit discharge of any capacitively coupled charge. This foil acts as a Faraday shield and is only useful when the items being demagnetized have large metal surfaces that may receive charge.

To prevent corona effects and breakdown, a high voltage resistance tape is placed on the inside of the epoxy glass channels 140 and 144 as shown at 305 for epoxy glass channel 144 and, in exploded form at 303 for epoxy glass channel 140. Plastic and glass tapes are used. The plastic tape is an adhesive backed, thin polyimide film of 1 to 5 mils in thickness sold under the trademark Kapton by E.I. DuPont de Nemours & Co. It is especially significant to avoid discharge at corners.

As best shown in the exploded view for FIG. 9, a 1-inch wide strip of plastic tape is first placed on each corner as shown at 307A and 307B followed by a 2-inch wide plastic tape on the bottom and sides as shown at 309, with two further pieces overlapping on the sides as shown at 309A and 309B. A 2-inch glass tape is finally placed on the bottom as shown at 311. The windings and window form a field approximately 2 and one-half inches long which is uniform and decreases at its end. In the preferred embodiment, the decreasing portion is sufficiently long for a plurality of cycles to randomly reorient the magnetic domains in the recording media while the magnetic material is traveling at 4 inches per second through the field.

Figure 10:
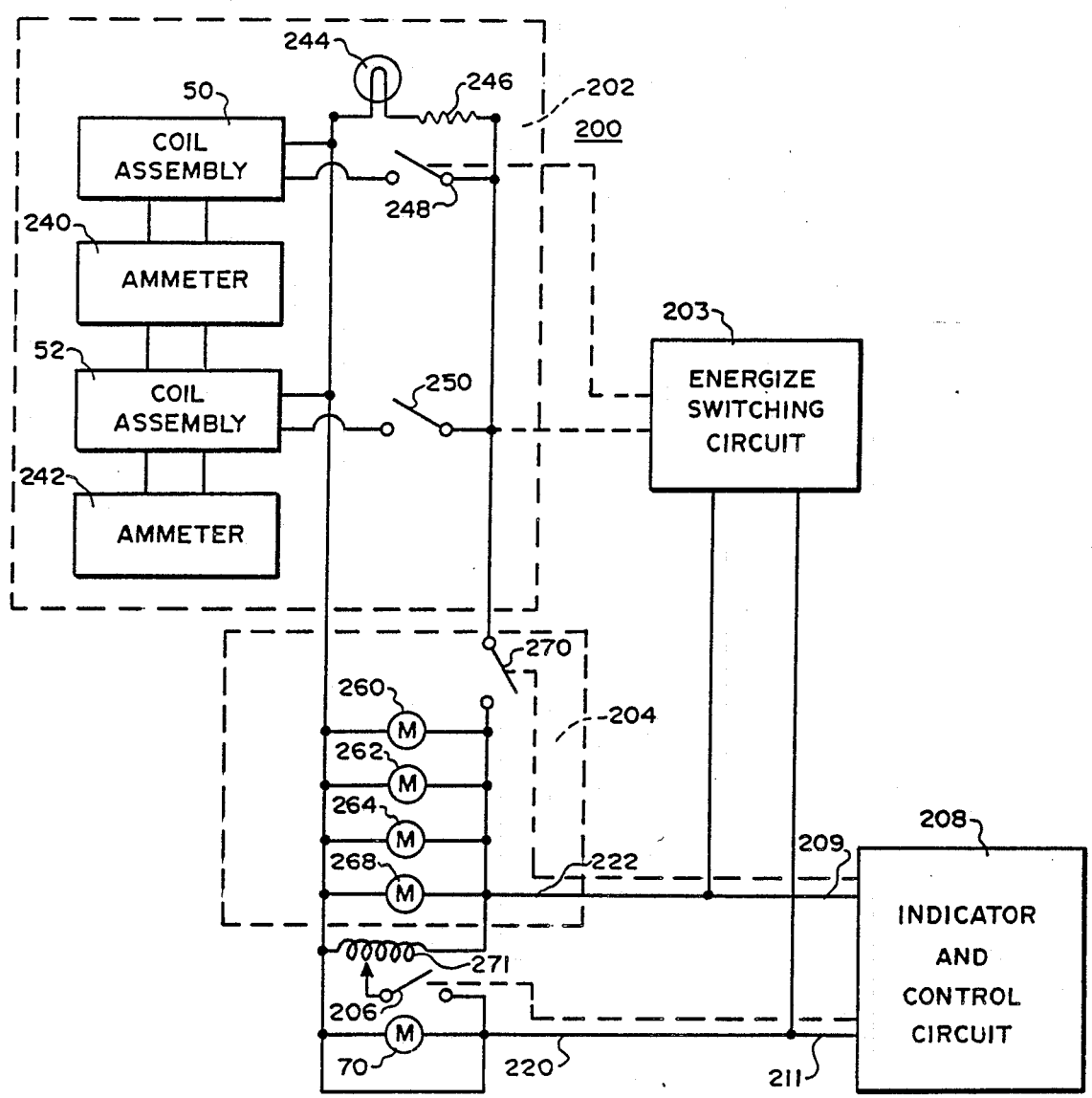
FIG. 10 is a block diagram of a circuit for driving the motors and degaussing coils in the embodiment of FIG. 1.

In FIG. 10, there is shown a circuit diagram of a circuit 200 for controlling the degausser 10 (FIG. 1) having a demagnetizing circuit 202, an energize switching circuit 203, a fan motor circuit 204, the conveyor motor 70, and an indicator and control circuit 208. These circuits receive 208 volt or 240 volt AC power through conductors 220 and 222 from the indicator and control circuit 208 with the demagnetizing circuit 202 receiving the power under the control of the energize switching circuit 203. The indicator and control circuit 208 provides indications and control operations including: (1) warning functions for high temperature and low demagnetizing current; (2) control of conveyor motion; (3) control of degaussing coil operation; and (4) control of the fan motor circuit 204 for cooling the coil assemblies 50 and 52 (FIG. 3).

To demagnetize tapes, the demagnetizing circuit 202 includes the first and second coil assemblies 50 and 52, first and second ammeters 240 and 242, a lamp 244, a resistor 246, and first and second relay controlled switches 248 and 250. The first and second ammeters 240 and 242 are electrically connected to corresponding ones of the first and second coil assemblies 50 and 52 to measure the current therethrough. Each of the first and second coil assemblies 50 and 52 are electrically connected directly to conductors 220 and 222 through a corresponding one of the first and second normally-open relay switches 248 and 250 which normally-open switches are controlled by the energize switching circuit 203. The lamp 244 is connected in series with the resistor 246 across the conductors 220 and 222 to indicate when power is being applied to the circuits.

To cool the first and second coil assemblies 50 and 52, the fan motor circuit 204 includes four fans driven by four corresponding fan motors 260, 262, 264, and 268 each of which is electrically connected across conductors 220 and 222 when a single-pole, single-throw switch 206 is closed. The switch 206 is in circuit with the conductor 220 and 222 to open and close the circuit at a location where conductor 220 is connected to one input terminal of the fan motors 260, 262, 264 and 268.

To drive the conveyor 34, the switch 206 is connected in circuit with conductors 220 and 222 and to the conveyor 34. Switch 206 is a relay-operated switch controlled by the indicator and control circuit 208. It may be operated manually, continuously or only when a recording medium is inserted and no temperature or low current fault is indicated. It is connected to the coil 271 to obtain the proper voltage for the motor.

The indicator and control circuit 208, in the preferred embodiment, is a hard wired circuit, using jumpers, switches and sensors for its control functions. It includes output terminals 209 and 211 and relays which operate the normally open contacts of switches 270 and 206. However, a computer may be used in a manner known in the art for the same functions.

Figure 11:
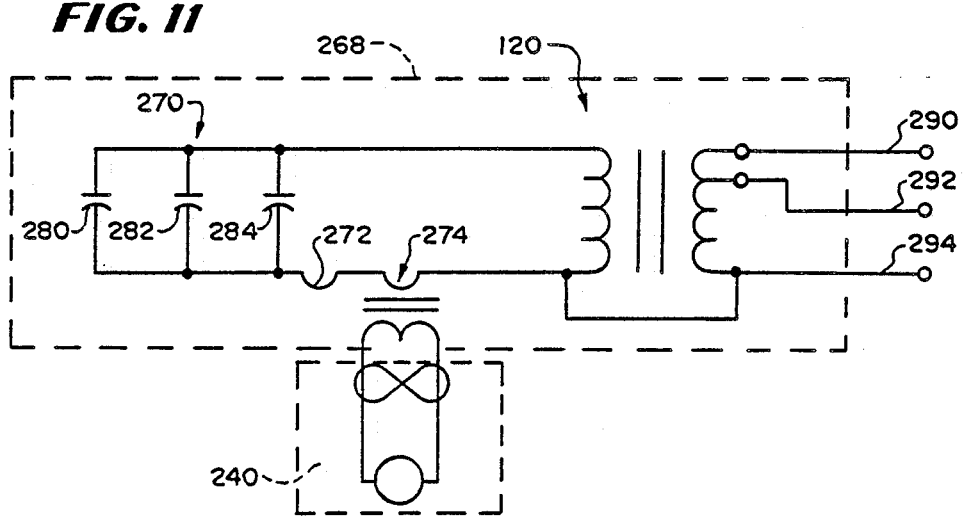
FIG. 11 is a circuit diagram of the demagnetizing coils used in the embodiment of FIG. 1.

In FIG. 11, there is shown a circuit diagram of one degausser circuit 268 and the first ammeter 240, with the circuit 268 including a capacitor circuit 270, an under-current sensing coil 272, an ammeter transformer 274, and the coil 120 of a coil assembly such as 50 or 52 (FIGS. 3 and 4) for providing a demagnetizing field.

To provide sensing and a high demagnetizing current with a low input line current, the coil 120 includes a primary winding connected to taps for connection to the mains and a secondary winding. The capacitor circuit 270 is connected to the secondary of the coil 120 to tune the coil for resonance.

To provide sensing, the secondary winding is in series with the ammeter transformer 274 to provide a current to the ammeter 240 representing the current through the ammeter transformer 274. The sensing loop of a current sensing relay energizes a relay, such as those having coils 480 (FIG. 13) and 482 (FIG. 13), while current is below a threshold to provide an indication that the current is too low for proper demagnetizing.

To provide the proper capacitance in a small enough physical side capacitor circuit, the capacitor circuit 270 includes three parallel connected capacitors 280, 282 and 284 for 50 hertz operation to provide a total capacitance of 9.4 microfarads (uf) for a 50 hertz circuit and two parallel capacitors to provide a total capacitance of 6.6 uf for a 60 hertz circuit. In the 60 hertz circuit, the two capacitors are each 3.25 uf capacitors and in the 50 hertz circuit, two of them are 3.25 uf and one is 2.75 uf.

The primary and secondary windings of the coil 120 are connected together and the primary winding is electrically connected through any two of the three conductors 290, 292 and 294 to provide the same voltage to the secondary regardless whether 208 volts or 240 volts AC is used. The primary winding in the 60 hertz circuit includes 51 turns between taps 294 and 292 and 59 turns between taps 294 and 290. The secondary includes 1200 turns with an inductance of 1.1 h. (henries). The primary winding in the 50 hertz circuit includes 60 turns between taps 294 and 292 and 65 between taps 294 and 290. The secondary winding includes 1217 turns with an inductance of 1.16 h. In the 60 hertz circuit another 12 turn coil is used in the primary winding, which 12 turns can be connected to add or oppose the other turns in the primary winding to accommodate variations in the circuit.

To permit a reasonable size degausser 10 with continuous processing of high coercivity tapes, the capacitance must be sufficiently low and still provide resonance. To accomplish this, the inductance of the coils 120 must be at least 0.5 h.

Figure 12:
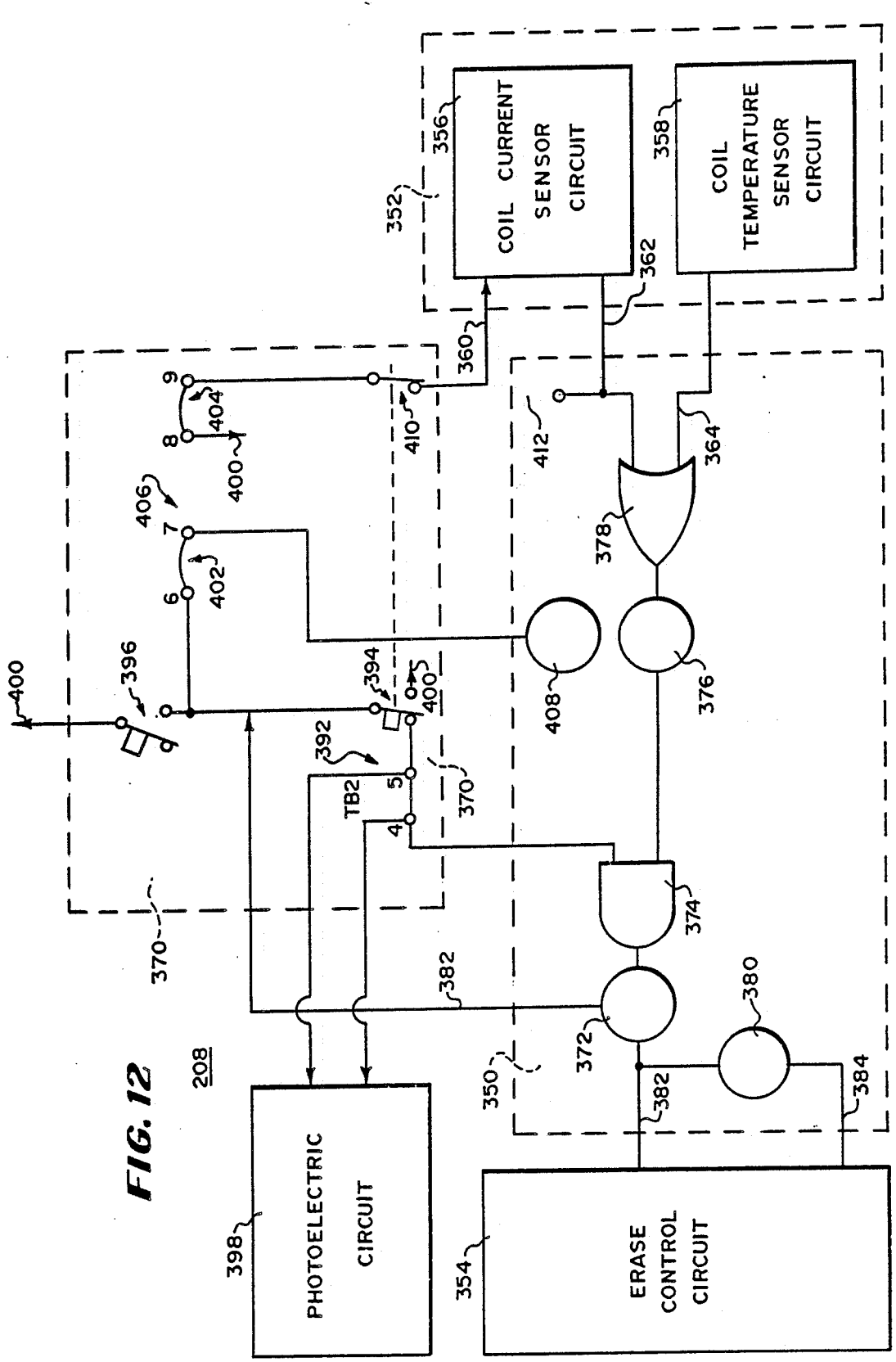
FIG. 12 is a logic diagram of the degausser.

In FIG. 12, there is shown a logic diagram illustrating the operation of the indicator and control circuit 208 (FIG. 10) having a control circuit 350, a programmable circuit 370, a sensing and indicating circuit 352, and an erase control circuit 354. The control circuit 350 responds to signals from the sensing and indicating circuit 352 as programmed by the programmable circuit 370 to control the erase cycle and the conveyor cycles of the degausser 10 (FIG. 1) with the programmable circuit 370 being programmable by a computer chip keyboard or jumpers or any other suitable mechanism. Jumpers and manual switches are used for this programming in the preferred embodiment.

To provide indications to operators and signals to the control circuit 350, the indicator and sensing circuit 352 includes a coil current sensor circuit 356 and a coil temperature sensor circuit 358. The coil current sensor circuit 356 is electrically connected to the control circuit 350 through the conductor 362 and to the programmable circuit 370 through conductor 360. The coil current sensor circuit 356 senses current through the first and second coil assemblies 50 and 52 (FIG. 3) and provides visual and audible alarms and control signals to conductors 360 and 362 in response thereto.

To provide indications and signals indicating high coil temperature, the coil temperature sensor circuit 358 is electrically connected to the control circuit 350 through a temperature conductor 364. It includes temperature sensors and indicators to provide indications to operators and signals to the control circuit through conductor 364 indicating high temperature on the first and second coil assemblies 50 and 52 (FIG. 3).

To interpret the signals received from the indicating and sensing circuit 352 in a manner controlled by the programmable circuit 370, the control circuit 350 includes an erase mode control latch 372, a wired AND circuit 374, an alarm status relay 376, an OR gate 378 and a delay latch 380. The latch 372 is electrically connected to the erase control circuit 354 and the delay latch 380. When energized, latch 372 energizes the erase control circuit 354 by supplying signals through output conductor 382 to energize one coil assembly, and after a delay, the latch 380 energizes the other coil assembly.

To control the latch 372, the wired AND gate 374 has one input electrically connected to the programmable circuit 370 and its other input electrically connected through an alarm status relay 376 to the wired OR gate 378. It thus energizes the erase mode control relay 372 when it receives a signal from both the programmable circuit 370 and the OR gate 378 through the alarm status relay 376. The erase control relay 372 also provides a feedback signal to the programmable circuit 370 through conductor 383 to cooperate in the preferred embodiment with other functions.

With this arrangment, the OR gate 378 receives signals from either the coil current sensor circuit 356 or the coil temperature sensor circuit 358 within the indicator and sensor circuit 352 to provide one of two signals to the AND gate 374 necessary to energize the erasers, which signals are modified by either the alarm status relay 376 or the programmable circuit 370.

To control operation of the eraser, the erase control relay 372 is a latching relay, which remains latched and: (1) causes energization of one erase circuit; and (2) activates the delay latch 380 to energize another erase circuit. The erase circuits in the preferred embodiment are of the first and second coil assemblies 50 and 52 (FIG. 3) The delay latch 380 includes an 18 microsecond delay to permit one circuit to be energized before the other and thus avoid having two large reactive impedances start receiving impedances at the same time. In the preferred embodiment, the transient behavior of two large inductances starting at the same time is undesirable. However, the programming is flexible enough to permit control of other reactances, such as for example, circuits which only magnetize with a DC field before other circuits or the same circuit demagnetize. The erase control relay 372 may be manually latched after an alarm to permit normal operation but remains unlatched until an indication is given either manually or by the programmable circuit to remove the alarm.

To provide a fail-safe control, the alarm status relay 376 is energized in the absence of an alarm signal from OR gate 378 to provide a signal to the AND gate 374 but is de-energized when an alarm is present. Thus, removal of the power operates in the same manner as an alarm signal on alarm status relay 376 to prevent the AND gate 374 from supplying a signal to the erase control relay 372 for energization of the first and second coil assemblies 50 and 52 (FIG. 3).

To permit programming of either a manually initiated erase operation or an automatically initiated erase operation, the programmable circuit 370 includes first, second and third programmable switches 392, 394 and 396. Programmable switch 394 may be electrically connected to an automatic cycle initiator 398 which, in the preferred embodiment, is a photoelectric circuit which senses the presence of a magnetic medium to be erased and initiates an erase cycle in response thereto. The preferred embodiment of programmable circuit 370 is shown in more detail in FIG. 13.

When programmable switch 392 is open and the photoelectric circuit 398 is energized, a signal is applied to AND gate 374 and, if there is no alarm from the alarm sensing relay 376, the first and second coil assemblies 50 and 52 are energized for an erase cycle. If the photoelectric circuit 398 is de-energized and the programmable switch 392 are open, there is no erase cycle.

If the programmable switch 392 is closed and no automatic sensor is connected thereacross, then cycles are only initiated when there is no alarm as indicated by alarm sensing relay 376 being latched and there is a further condition. One such further operation is the closing of manual erase initiator programmable contacts 396.

The programmable switch 394 is positioned to close a circuit between a source 400 of a positive 24 volts DC through the normally-latched alarm sensing relay 376 and programmable switch 394 and the programmable switch 392 to one input of the AND gate 374. The opening of the programmable switch 394 unlatches the erase control relay 372 if it has been latched to enable continuous erasing. A signal from the photoelectric circuit 398 also unlatches the erase control relay 372 when the programmable switch 392 is open. The source of a positive 24 volts 400 is electrically connected in a manner to be described hereinafter to programmable contacts 394, 404 and 406.

To program the conveyor 34 (FIGS. 1, 2 and 3), the programming circuit 370 includes programmable switches 402, 404 and 406. The conveyor control circuit 408 which energizes the conveyor motor 70 (FIGS. 4 and 10) is electrically connected to programmable switches 402 and 406.

With this circuit arrangement, when programmable switch 402 is closed, the conveyor control circuit 408 is energized by any one of: (1) a signal through the feedback loop 382 from the erase control relay 372 indicating it is latched since this signal is electrically connected through programmable switch 402 to the conveyor control circuit 408; (2) the closing of programmable switch 396 which closes the source of 24 volts 400 through the programmable switch 402 to the conveyor control circuit 408 or the opening of programmable switch 394, which closes it against the source of a positive 200 volts 400 and is electrically connected through programmable switch 402 to the conveyor control circuit 408. The closing of programmable switch 406 always directly connects the source of a positive 24 volts AC directly to the conveyor control circuit 408 to cause the conveyor to continuously operate.

To enable or disable the coil current indicator and sensor circuit 356, the programming section 370 includes the programmable switches 410 and 412. In the preferred embodiment, the programmable switch 410 is ganged to the programmable switch 394 so that when the programmable switch 394 is opened, the programmable switch 410 is opened, thus conducting an enable signal to be applied through conductor 360 which is directly connected to the programmable switch 410.

When the programmable switch 410 is opened, no enabling signal can be applied to the coil current sensor and indicator circuit 356 and no low current sensing signal disables the erase circuit but, alarms may be given by the coil current sensor and indicator circuit 356. When the programmable switch 410 and the programmable switch 412 are both closed, both the coil temperature sensing circuit and the field sensing circuits are prevented from de-energizing the alarm status relay 376 and neither a high temperature nor a low field current prevents an erasing operation when initiated by the photoelectric circuit 398 or manually through programmable switch 396.

In the preferred embodiment, the programmable switches 392, 402, 406, 404 and 412 are plugboard switches which may be manually inserted and the programmable switches 394 and 396 are manually operated push switches. However, any of the programmable switches may be plugboard switches, push switches or electronically controlled switches energized by software or other computer implementation in a manner known in the art. Moreover, any other type of programmable switch may be utilized instead of the push switches or plugboard programmable switches.

Figure 13:
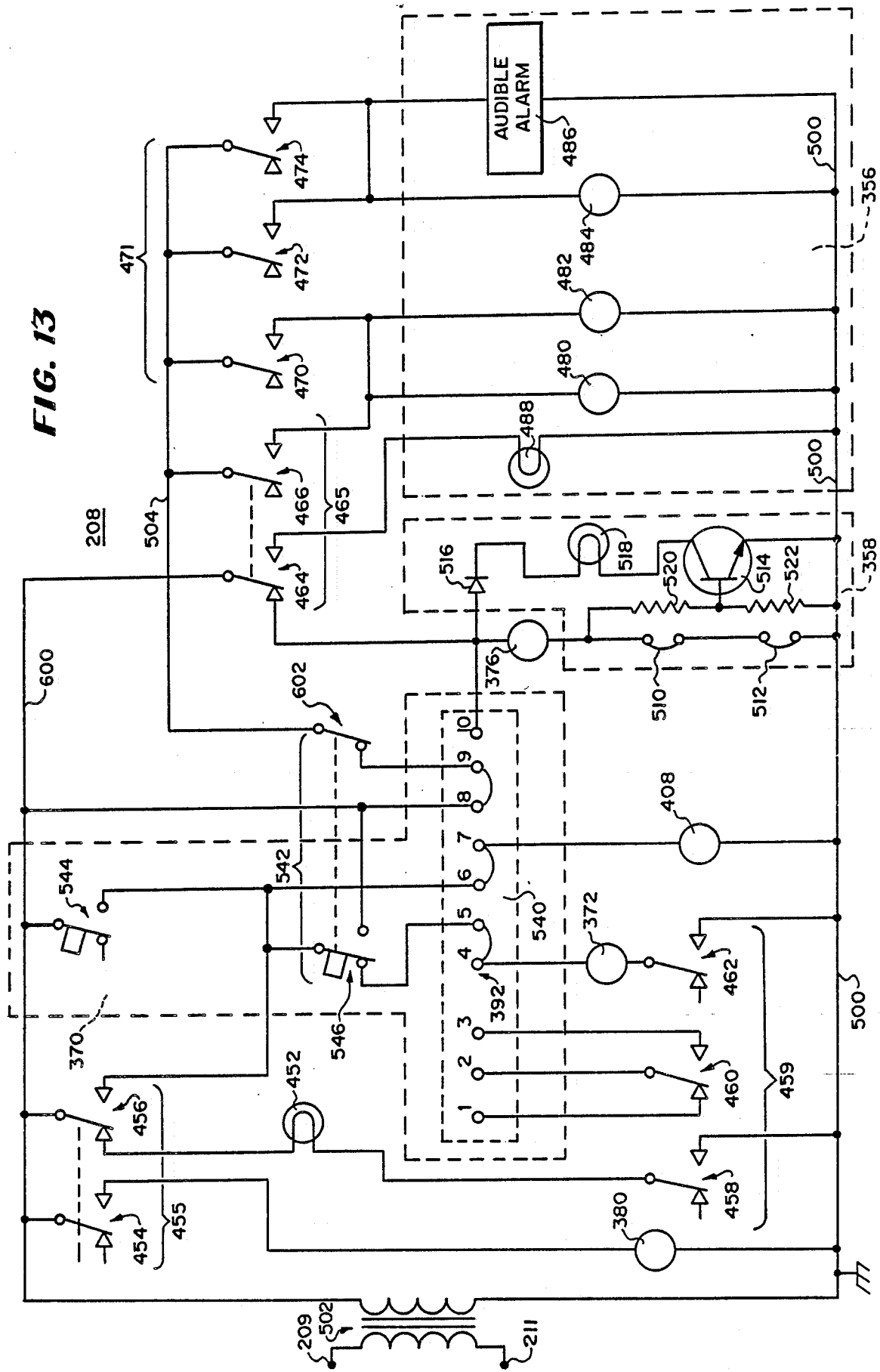
FIG. 13 is a schematic circuit diagram of an indicator and control circuit useful in controlling the degausser.

In FIG. 13, there is shown a schematic circuit diagram of the indicator and control circuit 208 having output terminals 209 and 211 electrically connected to conductors 222 and 220 (FIG. 10), the low-coil-current indicator circuit 356, high-coil-temperature circuit 358, the programmable circuit 370 and certain control circuitry. In this circuit, all relay contacts are shown in the de-energized, rest position.

To coordinate operation of the low coil-current indicator circuit 356, the high coil-temperature circuit 358, the programmable circuit 370 and the control circuitry, the control circuitry includes the four relay coils for relays 372, 376, 380 and 408, the "ready" lamp 452, a first bank of two relay switches 455, a second bank of three relay switches 459, a third bank of two relay switches 465 and a fourth bank of three relay switches 471. These units cooperate to control the operation of the conveyor 34, the demagnetizing coils and indications and control signals for the operation of the degausser 10 (FIG. 1).

To provide the selected electrical connections as programmed, the: (1) first bank 455 of relay switches includes a single-throw, single-pole switch 454, and a double-throw, single-pole switch 456; (2) the second bank 459 of relay switches includes a first single-pole, single-throw switch 458, a second single-pole, single-throw switch 462 and a single-pole, double-throw switch 460; (3) the third bank of relay switches 465 includes a single-pole, single-throw switch 466, and a single-pole, double-throw switch 464; and (4) the fourth bank of relay controlled switches 471 includes first, second and third single-pole, single-throw switches 470, 472 and 474.

To provide low field indications and measurements, the coil current indicator circuit 356 includes a first field sensing relay coil 480, a second field sensing relay coil 482, a field alarm latch 484, an audible alarm 486 and a low field indicator lamp 488.

The low field indicator lamp 488, the first and second field sensing relay coils 480 and 482, the field alarm latch 484, and the audible alarm 486 are all electrically connected at one end to conductor 500. The other end of conductor 500 is electrically connected to ground and to one end of the primary winding of transformer 502. The other end of the low field indicator lamp 488 is electrically connected to the normally open contact of switch 464, each of the other ends of the first and second field sensing relay coils 480 and 482 are electrically connected to the normally open contacts of switches 466 and 470 and the other end of the field alarm latch 484 and the audible alarm 486 are each electrically connected to the normally open contacts of switches 472 and 474.

The switches 464 and 466 are in the third relay switching bank 465 and the switches 470, 472 and 474 are in the fourth relay switching bank 471. Relayoperated switches 472 and 474 are each switched against their normally closed contact when the field sensing relay coils 480 and 482 are de-energized by a low current through sensing coil 272 (FIG. 11) if the power is connected and the programmable circuit 370 is programmed for low field alarm signals in a manner to be described hereinafter.

With this arrangement, power is applied through conductor 504 from the programmable circuit 540 through the normally open contacts of switches 472 and 474 and the field alarm latch 484 and audible alarm 486 to the ground conductor 500.

Switch 470 is energized after a timed delay when the power is turned on and this contact energizes first and second field sensing relay coils 480 and 482 engage switches 472 and 474 against their normally open contacts to latch the field alarm latch and audible alarm latch when a low current is sensed. Thus, the first and second field sensing relay coils 480 and 482, when the current through the windings are sufficiently small to cause them to close switches 472 and 474 to energize coil 484 and latch the audible alarm and the low-field lamp.

The current sensing relays (coils 480 and 482) are in the preferred embodiment, Potter and Brumfield under current relays, DPDT (double-pole, double-throw) sold under the designation SDAS-01-7Y2S1024.

To provide signals and an alarm when the temperature of either of the coils becomes too high, the sensor circuit 358 includes first and second thermal switches 510 and 512, each being mounted adjacent to a different one of the first and second coil assemblies 50 and 52 (FIG. 3), a NPN transistor 514, a diode 516, and an over-temperature lamp 518.

The base of the NPN transistor 514 is electrically connected through a first resistor 520 to one end of the temperature sensor 510 and to one end of the alarm status relay 376 in the control circuit and through a resistor 522 to conductor 500. Conductor 500 is also electrically connected to one end of the thermal switch 512, the other end resistor 522 and to the emitter of the transistor 514, the other end of the thermal switch 512 being connected to the other end of the thermal switch 510. The collector of the transistor 514 is electrically connected through the lamp 518 to the cathode of the diode 516; and the annode of the diode 516 is electrically connected to the other end of the alarm status relay 376 of the control circuit and to the normally closed contact of switch 464.

With this arrangement, the thermal switches 510, 512, and the resistors 520 and 522 form a bridge which, when unbalanced, causes current to flow through the transistor 514 to illuminate the lamp 518, drawing current through the diode 516. This de-energizes the alarm status relay 376 which provides a high-temperature alarm signal to the programmable unit 540 for purposes to be described hereinafter and switches the switches 458, 460 and 462 within the second relay control bank 459 against their normally closed contacts. This is the position in which they are shown in FIG. 13, but they are switched when power is applied to the degausser 10 by the energization of relay coil 376. Thus, upon receiving an alarm condition, these switches return to their normal position.

To provide an alarm signal to interrupt operation, the alarm status relay 376 is normally electrically energized and is de-energized by signals either indicating high temperature from the sensor circuit 358 or low current from the indicator circuit 356 by the opening on switch 464 or conduction of transistor 514. In response thereto, relay coil 376 switches switches 458, 460 and 462 of the second relay control bank 459 from their normally closed position to a normally open position which de-energizes the circuit.

When not energized, the alarm status relay 376 closes the switches 458, 460 and 462 to activate certain functions in the programmable circuit 540 to be described hereinafter and to cause illumination of the ready lamp 452 provided the switches in the first switching bank 455 have been switched by the erase control relay 372.

To cause the conveyor 34 to operate in accordance with programmed functions in the programmable function circuit 540, the relay coil 408 is connected at one end to the conductor 500 and at the other end to the programmable function circuit 540. When energized, it closes switch 206 (FIG. 10) to apply power to the conveyor motor 70 (FIG. 10).

To control the erase function and energize the first and second coil assemblies 50 and 52 (FIG. 3), the erase control relay 372 is electrically connected to the normally open contact of switch 462 at one end and at the other end to the programmable circuit 540. Thus, when relay switches 459 are closed against their normally open contacts by energization of switch 408, and when the programmable circuit is programmed for this purpose, the erase control relay 372 closes relay switches 454 and 456 against their normally open contact to energize the delay latch 380, and, one of the degaussing coil assemblies.

To provide a delay in the erase function before energizing a second degaussing coil assembly, the delay latch 380 is electrically connected at one end to conductor 500 and at its other end to the normally open contact switch 454 to be energized during an erase function. When energized together with the energitization of the erase control relay 372, power is applied through the coils of the other coil assemblies and erase lamp 610 (FIG. 14) to perform an erase function.

To program the indicator and control circuit 208, the programmable circuit 370 includes a plug board 540, a double-pole, double-throw push switch 542 and a single-pole, single-throw switch 544. The plugboard 540 includes 10 plugs each of which may receive a cable connection. While the terminology plugboard is used, other appropriate terminology could be used for the plugboard 540 such as pinboard or terminal strip as known in the art.

To provide programming, the plugs 1–10 of the plugboard 540 are electrically connected as follows:

(1) plug 1 is electrically connected to the normally closed contact switch 460;

(2) plug 2 is electrically connected to the fixed contact (the movable armature) switch 460;

(3) plug 3 is electrically connected to the normally open contact of switch 460;

(4) plug 4 is normally electrically connected to one end of the erase control relay 372, the other end being electrically connected to the normally closed contact of switch 462;

(5) plug 5 is electrically connected to the normally closed contact of the first pole 546 of the double-pole, double-throw switch 542;

(6) plug 6 is electrically connected to the fixed contact (the movable switch arm) of the fixed pole 546 of the double-pole, double-throw switch 542, to the normally open contact of the switch 544 and to the normally open contact of the switch 456;

(7) plug 7 is electrically connected to one end of the relay coil 408, the other end of which is electrically connected to conductor 500;

(8) plug 8 is electrically connected to the normally open contact of the first pole of the double-pole, double-throw switch 546 and to conductor 600 which is electrically connected to the fixed contact of switch 464, the fixed contact of switch 544, the fixed contact of switch 456, the fixed contact of switch 454 and to the other end of the primary winding of transformer 502 to provide a closed AC circuit when energized;

(9) plug 9 is electrically connected to the normally closed contact of the second pole 602 of the double-pole, double-throw switch 542; and

(10) plug 10 is normally electrically connected to the annode of the diode 516, one end of the alarm status relay 376 and the normally closed contact of switch 464.

With this arrangement, the following programming functions may be performed:

(1) To utilize the photoelectric circuit 398 (FIG. 12), plugs 4 and 5 are electrically connected through the photoelectric circuit to disconnect the manual switch and apply signals to AND gate 374 (FIG. 12) as described in connection with FIG. 12 and to disconnect the photoelectric circuit 398, plugs 4 and 5 are opened. The manner in which this operates will be discussed more fully in connection with FIG. 15.

(2) To permit programming of the conveyor 34, plugs 6 and 7 may be electrically connected in which case the conveyor 34 runs only when the first and second coil assemblies 50 and 52 are energized or the double-pole, double-throw switch 542 is closed to electrically connect plug 6 to the normally open contacts of switches 544 and 456. When plugs 7 and 8 are electrically connected, the connection from plug 6 through the coil 408 continuously energizes the conveyor 34 because of the electrical connection of conductors 500 and 600 across the relay coil 408.

(3) To program the alarm and signal operations, the connection of plugs 8 and 9 enable the low field alarm circuits by causing current in each coil to be monitored. Low current produces the visible and audible alarms in the audible alarm circuit 356 and the low current lamp 488 and causes the machine to switch from its erase operation to a stand-by mode, illuminating the stand-by lamp 452 and opening the energize switching circuit 203.

(4) When either of plugs 9 and 8 are electrically connected and plugs 10 and 8 are also electrically connected, the field alarm circuits are energized but, when there is a low field current alarm, the energized switching circuit 203 (FIG. 14) is not disabled and the erasing function continues. However, if plugs 8 and 9 are disconnected while plug 10 continues to be connected to plug 8, the field alarm circuits are entirely disabled and the erase function continues even in the presence of low current.

Terminal block 540 allows jumpers to be placed by the user to alter the control circuit operation in accordance with the several options described above. For personal safety, the control circuits operate on 24 volts AC as supplied by transformer 502.

Relay coil 376 is an alarm status relay. It is normally energized whenever the degausser is energized. Its coil is powered through the contact set 464 of the relay switch of coil 376 when in the position shown in FIG. 13 and through thermal switches 510 and 512. The three contact sets 459 of the relay 376 are thus normally operated and in the position opposite that shown in FIG. 13.

The relay contact set 458 supplies power to the "READY" lamp 452 in conjunction with contact set 456 of relay coil 372. Contact set 460 connects plugs 2 and 3 to permit the user to connect an external alarm indicator if he desires. Contact set 462 provides a 24-VAC common path to the coil of relay 372. With the circuit and thus relay 376 energized, the degausser is in its "READY" mode and prepared to be placed in the "ERASE" mode.

The jumper between terminals 8 and 9 of plugboard 540 applies power through READY switch normally closed contacts 602 of the manual switch 542 to a series of relay contacts. This jumper powers the low coil current alarm system.

The jumper between terminals 4 and 5 of plugboard 540 allows relay coil 372 to receive power when the erase switch 544 is depressed. This jumper is removed when the electric eye option is installed. The sequence of operation when the degausser is placed in the "ERASE" mode is as follows: (1) the operator pushes ERASE switch 544, momentarily closing its contacts; (2) 24 volts AC is applied through "READY" switch 546, jumper 4–5 and relay coil 372 to energize relay 372; (3) relay 372 latches itself ON through contact sets 456 and 546; and (4) the 24 volts AC is disconnected from the READY light 452 by contacts 456 and goes out.

Contact set 618 (FIG. 14) is closed by coil 372 and energizes relay 612 to close contacts 248 (FIG. 10), thus energizing the primary of the coil assembly 50. Contact set 454 applies 24 volts AC to the relay coil 380 energizing it to close contact set 616 and thus energize relay 614 to close switch 250 and energize coil assembly 52. Relay 380 provides a 20 millisecond delay in energizing coil assembly 52 so that both coils are not energized at same time. The inrush current is high when these electromagnets are energized and this delay prevents the extreme inrush current which would occur if both were energized at the same moment.

With both relays 372 and 380 energized, the ERASE lamp 244 (FIG. 10) is not illuminated, contact set 470 is closed and thus 24 volts AC is transmitted to relays 480 and 482. These relays have a built-in current transformer and electronics to monitor current. They are setup to monitor the secondary current in the transformer 120 (FIG. 11) of the coil assemblies 50 and 52. If the monitored current drops below the set threshold level, they operate their associated contacts 472 or 474 respectively. Assuming the monitored current to be high enough, the degausser is now operating in a stable ERASE mode. The current sensor 272 is shown (FIG. 11) as an example of the current sensors although it is only associated with one coil assembly and with one relay coil, in this case coil 480 and contact set 472. The other coil assembly of the coil assemblies 50 and 52 includes a similar current sensor to control relay 482 and thus contact set 474.

With relay 372 (FIG. 13) latched ON by its contact set 462, 24 volts AC is also applied through jumper 6–7 to relay 408. Relay 408 being now energized, closes its contact set 206, which applies 120 volts AC from autotransformer 271 to conveyor drive motor 70. The conveyor now runs.

If the secondary current in the corresponding transformer of one of the coil assemblies 50 or 52, drops below set level of its respective current monitor relay 480 or 482, their respective contacts operate. These contacts are in parallel so that operation of either relay applies power to relay coil 484, resulting in: (1) energization of audible alarm 486 through switch 474 (FIG. 13) under the control of relay 482 as explained below; (2) opening contact sets 455 by relay 372 to open the circuit to READY lamp 452 through switch 456 and close the circuit to relay coils 380 through switch 454 and 372 through switch 454, relay 408 and switch 462 controlled by relay 408; (3) de-energize coil 376 and illuminate FIELD alarm lamp 488 through switch 464; and (4) close contact sets 465 through relay 484 to apply power to relays 480 and 482 in parallel with contact 470.

When relay 376 is de-energized, all three sets of its contacts drop out to the position shown in FIG. 13, contact set 462 switches to open circuit relay coil 372, and contact set 458 opens opens preventing the READY lamp 452 from being illuminated when contact set 456 recloses to the position shown in FIG. 13.

When relay 372 drops out, its latching contacts 456 open; its contact set 618 (FIG. 14) opens which de-energizes relays 612 and 614 along with ERASE lamp 610; and contact set 454 opens to the position shown in FIG. 13 which de-energizes relay 380. Because relays 612 and 614 are de-energized, the coil assemblies are de-energized. The current in the secondary tank circuit of the coil assemblies (FIG. 11) now drops to zero and thus current sensing relays 480 and 482 remain in their operated state, being powered through contacts 602 and 466. Relay 484 and alarm 486 thus remain energized, contact set 456 remains at its normally open position shown in FIG. 13, and relay 408 losses power and de-energizes causing 408 contacts, 206 to open and the conveyor drive motor to stop. The degausser is now in a stable condition of low FIELD alarm.

To reset the machine and clear the alarm condition, the READY switch 542, is momentarily pushed by the operator. This momentarily opens the contact 602 removing power to 484, 480 and 482. The latched alarm condition is now removed. Notice that when switch 542 is pushed, contact 546 of READY switch 542 applies 24 volts AC to plug 6 through the jumper to plug 7 and to coil 408. Relay 408 energizes, closing its contacts 206, thus energizing the conveyor motor. This feature allows the operator to hold in the READY switch and run the conveyor to clear out tapes etc. which may have been inside the degausser when the ALARM and shut down occurred.

If the degausser is in the stable ERASE mode, relay 376 is energized as normal, relay 372 has been energized by momentarily pushing ERASE switch 544 and has latched itself on by contact 456. Relay 203 has energized, powering up the coil assemblies. Relay 380 has energized by contact 454, powering up the coil assembly. Relay 408 is energized through contact 456 powering up the conveyor drive motor.

If one of the coil assemblies overheats, such as for example because of a clogged fan filter, its respective thermal switch, either 510 or 512, opens. The current through the relay 376 is insufficient to keep its contacts activated because the current is reduced by the 10,000 ohm resistor 520. The small current through 520 into the base of transistor 514 is sufficient to saturate it on appropriate half cycles of the 24 volts AC supply. The TEMP lamp lights, being supplied power on the positive half cycles through contacts 465, diode 516 and the transistor 514 to common.

When relay 376 is de-energized by the open thermal switches 510 or 512, its contacts return to their rest position shown in FIG. 13. Thus, 372 drops out, which subsequently drops out relays 203, 380 and 408 in a manner previously described.

The degausser is in a stable TEMP alarm shut down mode. The TEMP light is on and the READY and ERASE lights out. The degausser cannot be placed in the ERASE mode until the thermal switches 510 or 512 has automatically reclosed re-energizing relay 376. When this occurs, the TEMP light will go out and the READY lamp will light.

In the TEMP alarm condition, the READY switch 546 can be pushed and held in to energize relay 408 and run the conveyor motor. This again allows manual clearing of tapes etc. which were in the machine when the TEMP alarm occurred.

When the electromagnet has cooled sufficiently and thermal switches 510 and 512 have automatically reclosed, relay 376 will again be energized. This places the degausser in its READY mode. To go into the ERASE mode, the operator must push the ERASE switch.

A high temperature condition where either thermal switch 510 or 512 opens will always de-energize relay 376 and thus always, through the sequence described, result in the electromagnets being de-energized. This is for safety reasons to prevent an electromagnet from catching on fire.

A low FIELD alarm as sensed by the magnet secondary current relays 480 or 482, however, is not a safety hazard. Therefore, some users may not desire such an alarm to shut down the erasing process. Some users may not even desire the FIELD to be monitored. These two operating modes can be programmed by the user by placement or removal of jumpers to terminal board 540.

By adding a jumper between terminal 9 and 10 of terminal block 540, the machine is configured such that a low FIELD alarm will give a visual and audible alarm but will not shut down the erase operation.

The current sensing relays 480 and 482 monitor the electromagnet secondary current as before. If a low current exists, their contacts operate, energizing relay 484 and the audible alarm 486. Contact sets 465 now applies power to field alarm lamp 488 thereby lighting the lamp. This is as previously described.

A jumper between terminals 9 and 10 of terminal block 540 applies 24 volts AC to relay 376 so that the opening of the contacts of relay 484 does not cause 376 to de-energize. With relay 376 remaining energized, the rest of the degausser circuitry is not affected by the FIELD alarm condition and the degausser remains operating in the ERASE mode. The FIELD alarm condition has only sounded the buzzer and lighted the FIELD alarm light.

The alarm condition will clear in two ways, either automatically when the electromagnets' secondary current comes up above the set threshold level, or manually when the READY switch is pushed by an operator.

The increase of electromagnet secondary current causes the contacts of relays 480 and 482 to return to their rest position shown in FIG. 13. This de-energizes relay 484 and alarm 486. The contacts of relay 484 open which causes lamp 488 to go out. The FIELD alarm is cleared and the degausser continues to run in the ERASE mode.

With a standing FIELD alarm condition, pushing the READY switch 546 by an operator, returns the degausser to the READY mode and clears the alarm. Contacts 602 opens causing relays 484, 480 and 482 and alarm 486 to de-energize. Contact 546 of READY switch 542 opens causing relay 372 to de-energize which subsequently de-energizes relays 380, 203 and 408. The machine returns to the READY mode and the field alarm condition is cleared.

If all jumpers are removed from terminal 9 of terminal block 540: (1) no power is applied through contacts 602 to the FIELD alarm circuit 484, 480, 482 and 486; (2) the contacts of relays 480 and 482 will always remain in their rest position; (3) relays 484 and 486 will never be energized; (4) lamp 488 will never light; (5) contacts 465 will always be closed as shown in FIG. 13; (6) relay 376 will always have 24 volts AC applied to one of its terminals; (7) the FIELD alarm system is disabled; and (8) the degausser can be operated in the ERASE mode with no regard to electromagnet secondary current.

If the jumper between terminals 6 and 7 of terminal block 540 is removed, and a jumper added between terminals 7 and 8, relay 408 is energized any time line power is applied to the degausser. Relay 408 will close switch 206 and the conveyor drive motor 70 will be powered, causing the conveyor to run whenever the degausser is energized such as by a master switch for turning on the degausser.

Figure 15:
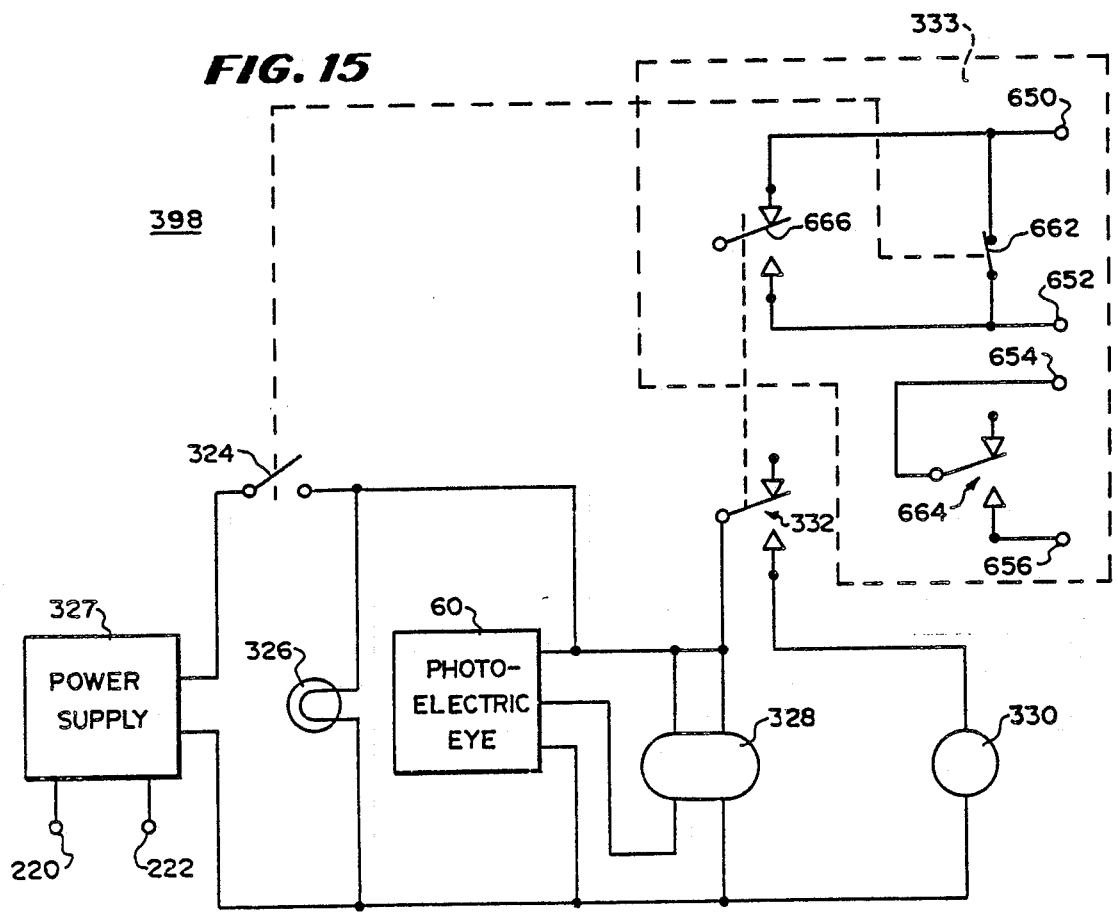
FIG. 15 is a circuit diagram partly as a block diagram and partly schematic for a sensor circuit used in the embodiment of FIG. 1.

As shown in FIGS. 15 and 13, the electric eye, the switches and the relay contacts are in their OFF position in FIG. 15 and a circuit is completed between terminals 650 and 652 through closed switch 662 and plugs 4 and 5 of board 540.

When the electric eye circuit is turned ON, contact 324 closes applying 24 volts AC to power the circuits and the contact of switch 662 opens preventing relay 72 from being energized and thus preventing the degausser from being manually placed in the ERASE mode by an operator pushing switch 544.

When the electric eye sensor 60 detects an object entering the degausser, it provides continuity between two of its leads and the control input of relay 328 is energized. Relay 328 is a resetable 30-second delay dropout relay. Its two sets of contacts immediately operate and close. This provides a connection between terminals 4 and 5 of terminal block 540.

Switch 332 applies power to relay 330. Relay 330 is a one-shot, momentary close relay. When power is applied to it, it operates its contacts for about one second and then releases them. It thus provides a momentary connection between terminals 8 and 6 of terminal block 540. This momentary connection is directly across the contacts of ERASE switch 544. This energizes relay 372 through contacts 546 of READY switch 542 and the contacts of relay 328. The degausser thus enters its ERASE mode as previously described.

As long as objects continue to enter the degausser, the electric eye sensor will reset the 30 second delay drop out relay 318 and the degausser will remain in the ERASE mode.

As a safety feature, the degausser can always be manually changed from ERASE to READY since power to relay 372 is always applied through contacts 546 of READY switch 542.

When objects are no longer entering the degausser and the 30 seconds elapse, relay 328 will drop out and its contacts will open, removing power from relay 330 which in this case is non-consequential. Switch 666 opens which removes continuity between terminals 4 and 5 of terminal block 540. Relay 372 will thus drop out which subsequently returns the degausser from its ERASE to READY mode as previously described.

The FIELD alarm configurations and conveyor run option are not effected by the use of the electric eye. The user can still configure these features any way he desires.

As can be understood from the above description, the operation of the circuit may be readily programmed using plug board circuitry and switches. However, as described above, any other programmable circuits may be used although the preferred embodiment uses plug board circuitry for simplicity and economy.

Figure 14:
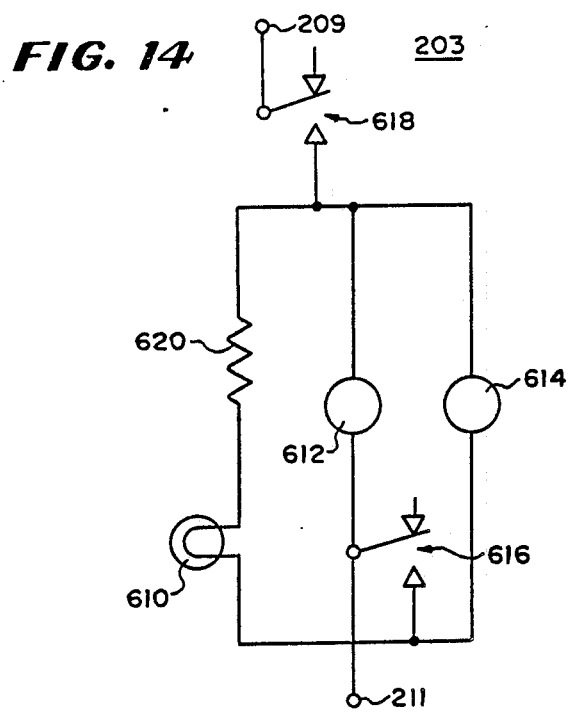
FIG. 14 is a schematic circuit diagram of a portion of the block diagram of FIG. 10.

In FIG. 14, there is shown a schematic circuit diagram of the energize switching circuit 203 having an erase lamp 610, a first coil assembly relay 612, a second coil assembly relay control coil 614, a first relay-operated switch 616 and a second relay-operated switch 618.

The coil assembly relay 612 electrically controls contact 250 (FIG. 10) to energize the coil assembly 52 and relay coil 614, when energized, electrically closes switch 248 (FIG. 10) to energize coil assembly 50. These coils each have one end electrically connected to the normally open contact of switch 618 which is electrically connected to conductor 209 upon energization of relay 372 (FIGS. 12 and 13) indicating an erase operation. The other end of coil 614 is electrically connected to the normally open contact of switch 616 which is energized by the delay relay 380 (FIGS. 12 and 13) and through lamp 610 and a resistor 620 to normally open contact 618. The other end of coil 612 is electrically connected to the fixed contact (movable switch arm) of switch 616 and to conductor 211.

With this arrangement, when the erase function is initiated, contact 618 closes to complete a circuit through the coil 612, which arrangement provides current to close the contacts 250 (FIG. 10) and initiate an erase operation in a coil assembly. After a time delay, switch 616 is closed by the time delay relay 380 to put coils 612 and 614 and the lamp 610 with the resistor 620 in parallel, thus causing closing of switch 248 (FIG. 10) and initiate an erase operation in the second assembly while illuminating the lamp 610.

In FIG. 15, there is shown a photoelectric detector circuit 398 having a power supply 327, a switch 324, a lamp 326, the photocell 60 (FIG. 3), first and second relay coils 328 and 330, and a single-pole, double-throw switch 332 and plugboard connecting circuit 333. This circuit, upon detecting a video cassette on the conveyor, energizes the first and second coil assemblies 50 and 52, energizing the first coil 50, and then, through a delay relay, energizing the second coil assembly 52 to provide timed energization without excessive expenditure of energy and heat rise.

The power supply 327 is a 24 volt DC power supply energized from the source on conductors 220 and 222. It applies the 24 volt DC through the switch 324 to the lamp 326 and the photocell 60, the first relay coil 328 and the second relay coil 330, with the second relay coil being energized through the switch 332 only.

The plugboard connecting circuit 333 includes a first plug 650, a second plug 652, a third plug 654 and a fourth plug 656, all adapted to be inserted in the plugboard 540 (FIG. 13) into sockets 4, 5, 6 and 8 respectively. With these plugs inserted in the plugboard, the photodetector circuit 398 (FIG. 12) is electrically connected to the degausser 10 (FIG. 1). It will now detect a cassette to be erased as it comes in the entrance and start an erase operation, which will continue until it fails to detect a cassette for at least 30 seconds. While 30 seconds has been selected, the time may be varied as described hereinafter in accordance with the needs of the user.

To accomplish this purpose, the relay coil 328 is a Potter and Brumfield delay release, DPDT (double-pole, double-throw) relay and in the preferred embodiment, is adjusted for 30 seconds delay. It switches the normally open single-pole, double-throw switch 332 and the normally open single-pole, double-throw switch 666 to the closed position.

The switch 666 has its normally open contact electrically connected to plug terminal 652 and the fixed contact of the normally closed switch 662 and its fixed contact (movable arm) electrically connected to the normally closed contact of the switch 662 and to the plug 650 so that, the relay 328 closes both switch 332 and switch 666 to short plugs 4 and 5 when energized. However, switch 324 is ganged to switch 662 to open that switch 662 when depressed, and this switch 324 is closed upon insertion of the photoelectric cell to cause it to be inactivated until a magnetic medium is detected. Closing switch 662 inactivates the photoelectric detector 398 by shorting plugs 4 and 5 (FIGS. 12 and 13) to short the output of photoelectric circuit 398 (FIG. 12).

Sockets 654 and 656 are electrically connected respectively to the fixed contact of a normally open switch 664 and the normally open contact of the switch 664 and are controlled by the relay 330, which when energized closes the switch to short plugs 654 and 656.

Relay 330 is a Potter and Brumfield adjustable interval relay designated as CHD-38-30021.

The lamp 326 is electrically connected across the power supply 327 in series with the switch 324 so that, when the switch 324 is closed, activating the photoelectric detector 398, lamp 326 is illuminated. The power supply is also electrically connected across the photoelectric eye 60, the power input electrodes of the relay 328 and through normally open switch 332 to the relay coil 330. The output electrode of the photoelectric eye 60 is electrically connected to the relay 328 to energize it when an object is detected, causing the switch 332 to close so as to connect together plugs 4 and 5 in the plugboard and energize the relay 330, which shorts plugs 6 and 8 in the plugboard together, thus initiating an erase operation. If another object has not been detected on conveyor 34 to re-energize the relay 328 within the next 30 seconds, relay 328 de-energizes to open normally open switch 332 to permit switch 666 to open and relay 330 to be de-energized, thus opening switch 664 and inactivating the coil assemblies 50 and 52 (FIG. 3).

Although a photoelectric detector, a high-temperature detector and a low-field current detector have been disclosed to cooperate with manual operations in a programmed manner to control the operation of the demagnetizer, it is apparent that other detectors could be used to expedite the operation of the eraser in a continuous throughput operation. For example, the operation could be automatically turned on by a timing clock at certain times of the day or in response to a certain weight placed upon a longer conveyer indicating a supply of erasable magnetic media is ready to be run through the degausser.

From the above description, it can be understood, that the degausser of this invention has several advantages, such as: (1) it continuously degausses tapes without the need for rerunning the tapes through the unit; (2) the tapes are better erased; (3) the unit is more durable and has reduced breakdown of insulation; and (4) it is able to be programmed for different operations.

Although a preferred embodiment of the invention has been described with some particularity, many modifications and variations in the preferred embodiment are possible without deviating from the invention. Therefore, it is to be understood, that, within the scope of the appended claims, the invention may be practiced other than as specifically described.

What is claimed is:

1. A degausser for degaussing a magnetic recording medium comprising:
   at least first and second degaussing stations; said first station having a first means for creating a first uniform horizontal magnetic field having a peak field strength in the range of 500 to 5,000 oersteds;
   said second station including a second means for creating a second uniform horizontal magnetic field having a peak field strength in the range of 500 to 5,000 oersteds;
   conveyor means for moving a magnetic media, through said first and second uniform horizontal magnetic fields;
   said fields having a fringe area of weaker field and an area of stronger field and the means for moving includes a means for moving at a speed which maintains the magnetic media within the stronger portion of the uniform field of said first means for generating a magnetic field through at least one peak of AC current applied to the means for generating the magnetic field and in said fringe area for a least one peak; each of said fields being in the center of a winding having an inductance of at least 0.5 henries;

said means for creating a first uniform horizontal magnetic field and said means for creating a second uniform horizontal magnetic field, each including a winding having a corresponding central window with a substantially horizontal axis;

said conveyor means including a portion passing through said windows in the plane of said horizontal axes and at a different angle to each, whereby said fields each primarily act on said magnetic material in a different direction; and said conveyor means including an antistatic conveyor belt.

2. A degausser according to claim 1 in which said belt moves at a rate of at least one inch per second.

3. A degausser according to claim 2 in which said belt is supported by rollers having insulative bearings and is contained in a housing having at least portions insulated to prevent current from flowing therethrough.

4. A degausser according to claim 3 further including a plurality of fans and a corresponding plurality of filters; said filters being mounted to said housing and at least certain of said fans, each being mounted inside said housing adjacent to a different one of said plurality of fans to draw air therethrough; said fans being aligned to force air against the sides of said housing.

5. A degausser according to claim 4 including delay means for preventing simultaneous changes in operation of more than one of said first and second means for creating a first and second uniform horizontal magnetic field.

6. A gaussing coil comprising:
a bobbin;
a first winding wound around said bobbin adjacent to an opening therein;
a second winding wound around said bobbin adjacent to said first winding and transformer coupled thereto;
said second winding being energized with AC voltage;
said first winding being transformer coupled to have a higher voltage;
a ferromagnetic path around said second winding to form a low reluctance path to the opening in said bobbin;
said opening being adapted to receive magnetic material for erasing;
the high voltage winding being coupled to capacitors for resonance and the low voltage winding being electrically connected to a source of mains power;
said bobbin including a plurality of bolts;
said bolts having an insulated material to prevent arcing; and
insulative sheet material adjacent to said window.

7. A degaussing coil according to claim 6 in which said bobbin including a Faraday shield about the bottom of the bobbin, whereby metal parts of devices to be magnetized receive less static charge.

8. A programmable degausser comprising: a degaussing coil;
conveyor means running through said degaussing coil, whereby magnetic material may be brought into a position adjacent to said degaussing coil for demagnetizing thereby;
sensing means for sensing conditions relevant to said degausser operation;
first and second means for controlling energization of said coil;
programmable means for selecting at least one of first and second operative means;
said sensing means including means for sensing the presence of objects;
said first operative means causing said coil to be energized only upon energization of the means for sensing the presence of one of said objects; and
said second operative means causing said coil to be energized only upon manual closing of a switch.

9. A programmable degausser in accordance with claim 8 in which:
said sensing means for sensing conditions relevant to said degausser operation includes means for providing signals indicating high temperatures; and
said programmable degausser further includes means operable upon energization of said sensing means for disabling said second operable means.

10. A programmable degausser according to claim 9 in which:
said sensing means includes means for sensing below normal current in said degaussing coil; and
means operable upon energization of said means for sensing below normal current for deenergizing said coil.

11. A programmable degausser according to claim 10 further comprising:
indicator means; and
programmable means for connecting said indicator means for operation upon energization of said sensing means.

12. A degausser comprising:
at least first and second stations;
said first station having first means for creating a first horizontal magnetic field;
said second station including second means for creating a second horizontal magnetic field;
said first and second means for creating first and second horizontal magnetic fields including means for generating AC current having peaks;
conveyor means for moving a magnetic media through said first and second horizontal magnetic fields;
said conveyor means for moving including means for moving at a speed which maintains the magnetic media within the first horizontal magnetic field of said first means for creating a first magnetic field through at least two peaks of a cycle of AC current, applied to the means for creating the first horizontal magnetic field;
said first and second means for creating first and second horizontal magnetic fields, each being at a different angle with respect to said conveyor means;
each of said first and second means for creating first and second magnetic fields including a corresponding one of two coils, each having a corresponding one of first and second windows;
at least a portion of said conveyor means passing through said first and second windows;
sensing means for sensing conditions relevant to said degausser operation;
programmable means for selecting at least one of first and second operative means;

said first operative means causing said coil to be energized with said AC current only upon energization of a sensing means; and said second operative means causing said coil to be energized upon depressing of a manual button.

13. A degausser for degaussing magnetic recording material comprising:

at least one degaussing station;

said degaussing station having a means for creating a uniform horizontal magnetic field having a peak strength in the range of 500 to 5,000 oersteds;

conveyor means for moving magnetic media through said uniform horizontal magnetic field;

said field having a fringe area of weaker field and an area of stronger field and the means for moving including a means for moving at a speed which maintains the magnetic media within the stronger portion of the uniform field of said means for generating a magnetic field through at least one peak of AC current supplied to the means for generating the magnetic field and in said fringe area for at least one peak; each of said fields being in the center of a winding having an inductance of at least 0.5 henries;

said means for creating a uniform horizontal magnetic field including a winding having a corresponding central window;

said conveyor means including a portion passing through said window in the plane of said horizontal axis; and means for energizing said means for creating a uniform magnetic field wherein said magnetic field varies at a frequency lower than 60 hertz; said means for creating a uniform magnetic field being resident at said frequency.

14. A degausser in accordance with claim 13 in which said means for energizing includes means adapted to receive power from a mains power source and means for modulating said power from said mains power source at a frequency lower than said mains frequency.

* * * * *